United States Patent
Yokota et al.

(10) Patent No.: US 9,679,377 B2
(45) Date of Patent: Jun. 13, 2017

(54) MEDICAL IMAGE PROCESSING APPARATUS AND A MEDICAL IMAGE PROCESSING METHOD

(71) Applicant: Toshiba Medical Systems Corporation, Otawara-shi (JP)

(72) Inventors: Tetsuya Yokota, Nasushiobara (JP); Satoshi Wakai, Nasushiobara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 44 days.

(21) Appl. No.: 14/924,190

(22) Filed: Oct. 27, 2015

(65) Prior Publication Data

US 2016/0063697 A1 Mar. 3, 2016

Related U.S. Application Data

(63) Continuation of application No. PCT/JP2014/064281, filed on May 29, 2014.

(30) Foreign Application Priority Data

May 30, 2013 (JP) .................................. 2013-114518
Aug. 13, 2013 (JP) .................................. 2013-168262

(51) Int. Cl.
*G06T 7/00* (2006.01)
*G06T 7/33* (2017.01)

(52) U.S. Cl.
CPC .............. *G06T 7/0012* (2013.01); *G06T 7/33* (2017.01); *G06T 7/344* (2017.01);
(Continued)

(58) Field of Classification Search
USPC ....................................... 382/128, 131, 294
See application file for complete search history.

(56) References Cited

U.S. PATENT DOCUMENTS 6,266,453 B1 7/2001 Hibbard et al.
7,684,604 B2 * 3/2010 Bystrov ................. A61B 5/055
378/19
(Continued)

FOREIGN PATENT DOCUMENTS

JP 09-218939 A 8/1997
JP 2003-529406 A 10/2003
(Continued)

OTHER PUBLICATIONS

International Search Report mailed Aug. 12, 2014 for PCT/JP2014/064281 filed May 29, 2014 with English Translation.
(Continued)

*Primary Examiner* — Ishrat I Sherali
(74) *Attorney, Agent, or Firm* — Oblon, McClelland, Maier & Neustadt, L.L.P.

(57) ABSTRACT

According to embodiment, a medical image processing apparatus includes input interface circuitry and processing circuitry. The input interface circuitry inputs at least three landmarks in a first and second slice image group. The processing circuitry determines, in each of the first and second slice image group, a first axis connecting two points in the landmarks and a second axis that passes through another point different from the two points and is orthogonal to the first axis. The processing circuitry performs a registration between first slice images belonging to the first slice image group and second slice images belonging to the second slice image group by using the first and second axes in the first slice image group and the first and second axes in the second slice image group.

13 Claims, 14 Drawing Sheets

(52) U.S. Cl.
CPC ............... *G06T 2207/10004* (2013.01); *G06T 2207/10081* (2013.01); *G06T 2207/10104* (2013.01); *G06T 2207/10108* (2013.01); *G06T 2207/10136* (2013.01); *G06T 2207/30048* (2013.01); *G06T 2207/30204* (2013.01)

(56) References Cited

U.S. PATENT DOCUMENTS

| | | | | |
|---|---|---|---|---|
| 7,738,683 | B2* | 6/2010 | Cahill | G06T 7/0012 |
| | | | | 382/128 |
| 7,925,328 | B2* | 4/2011 | Urquhart | A61B 90/14 |
| | | | | 600/429 |
| 8,194,950 | B2* | 6/2012 | Bystrov | G06T 7/38 |
| | | | | 382/128 |
| 8,498,459 | B2* | 7/2013 | Chefd'hotel | G06K 9/6215 |
| | | | | 382/128 |
| 8,611,692 | B2* | 12/2013 | Nimnual | G06T 7/37 |
| | | | | 382/276 |
| 8,620,051 | B2* | 12/2013 | Djerizi | G06T 7/33 |
| | | | | 356/456 |
| 9,105,085 | B2* | 8/2015 | Bond | G06T 7/0028 |
| 2013/0094738 | A1 | 4/2013 | Bond | |

FOREIGN PATENT DOCUMENTS

| | | |
|---|---|---|
| JP | 2009-045284 A | 3/2009 |
| JP | 2011-067253 A | 4/2011 |
| JP | 2011-120825 A | 6/2011 |
| JP | 2011-123045 A | 6/2011 |

OTHER PUBLICATIONS

International Written Opinion mailed Aug. 12, 2014 for PCT/JP2014/064281 filed May 29, 2014.

* cited by examiner

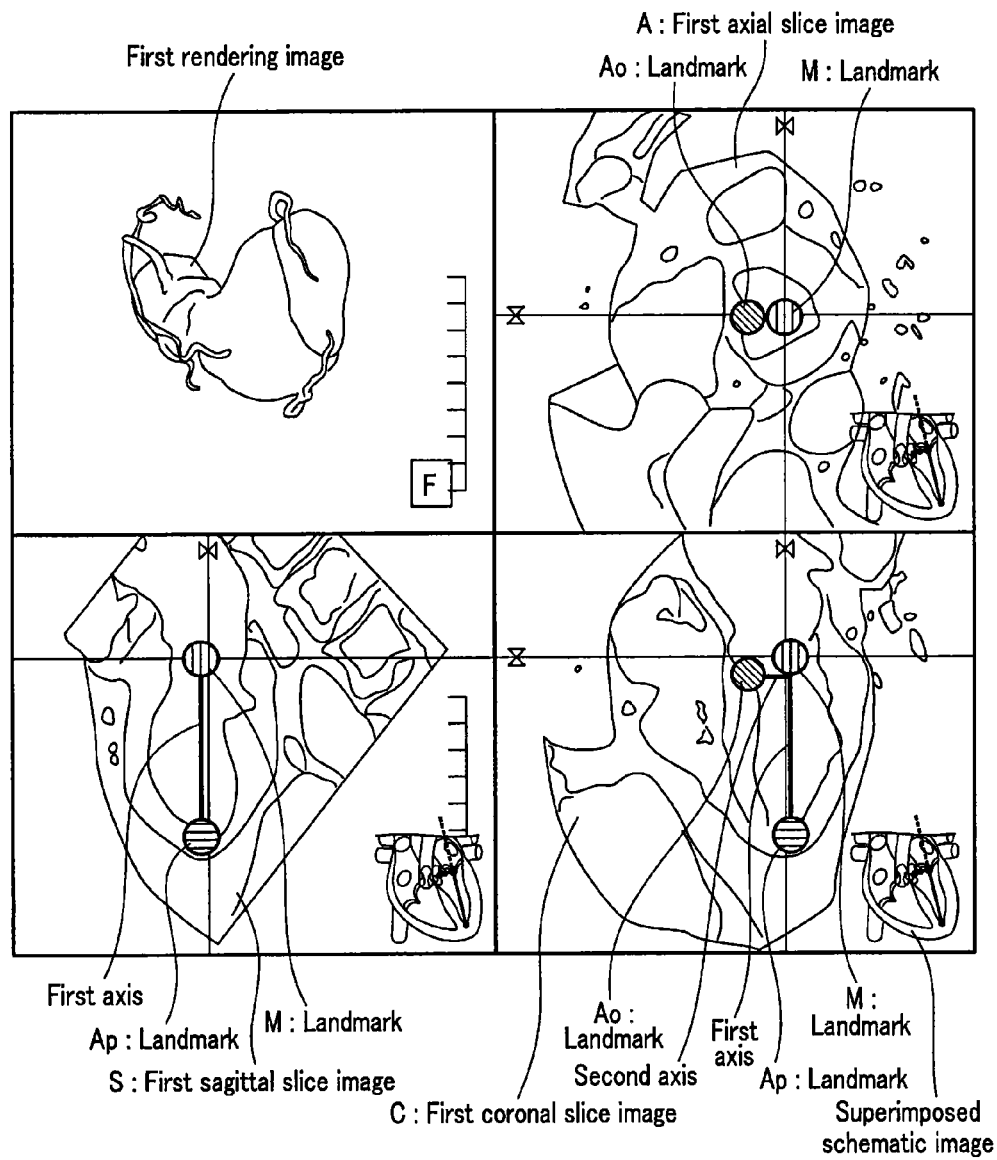
F I G. 2

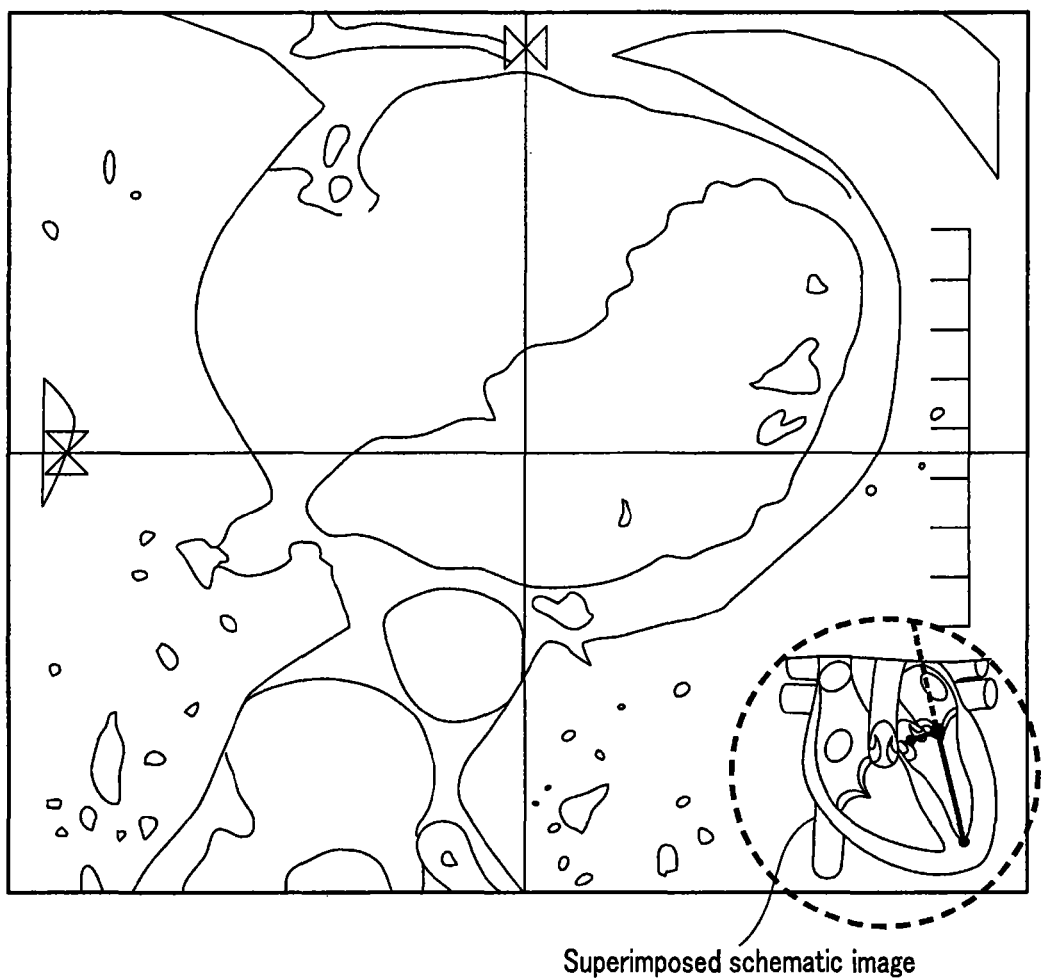
Superimposed schematic image
F I G. 3

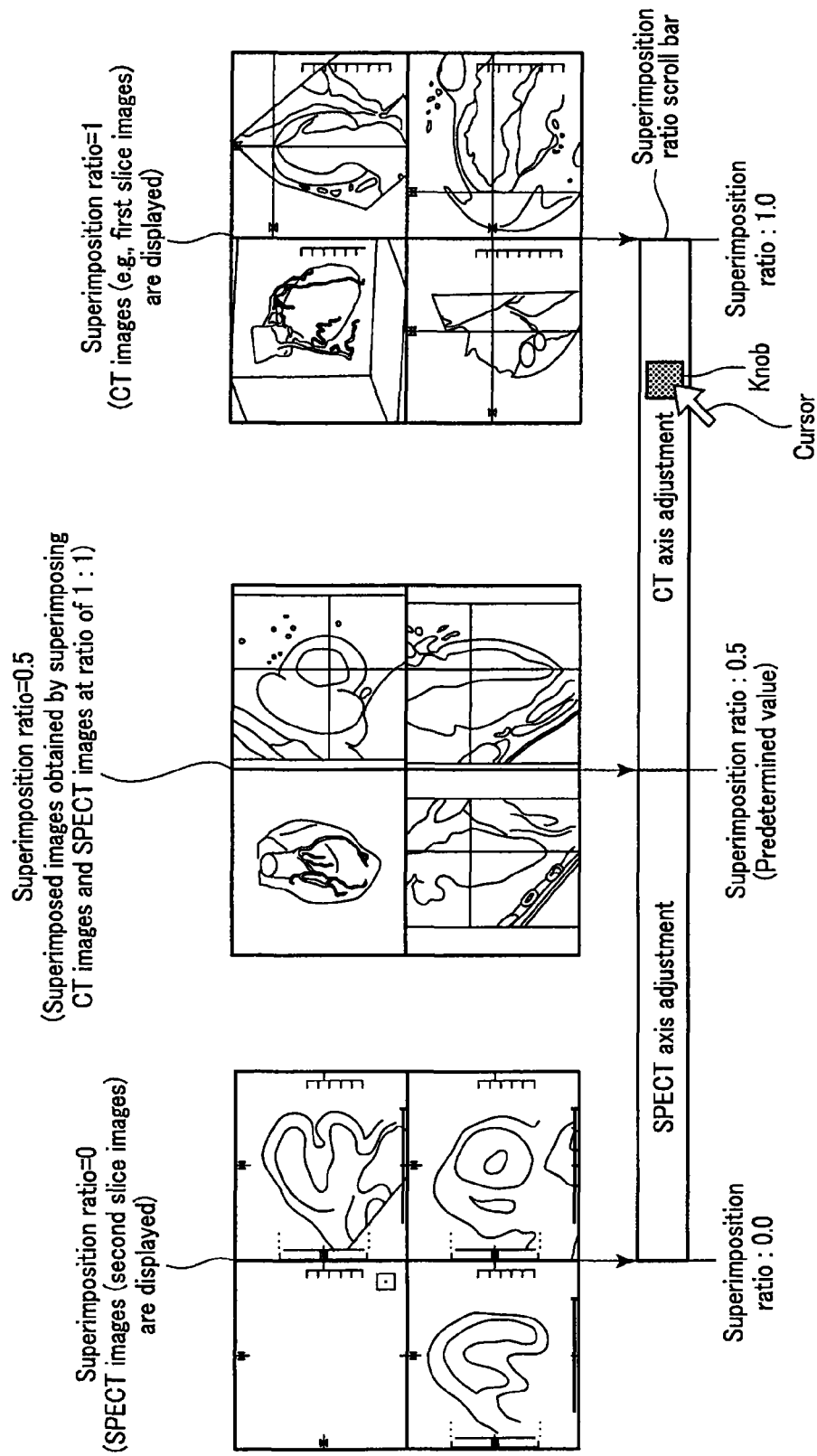
F I G. 9

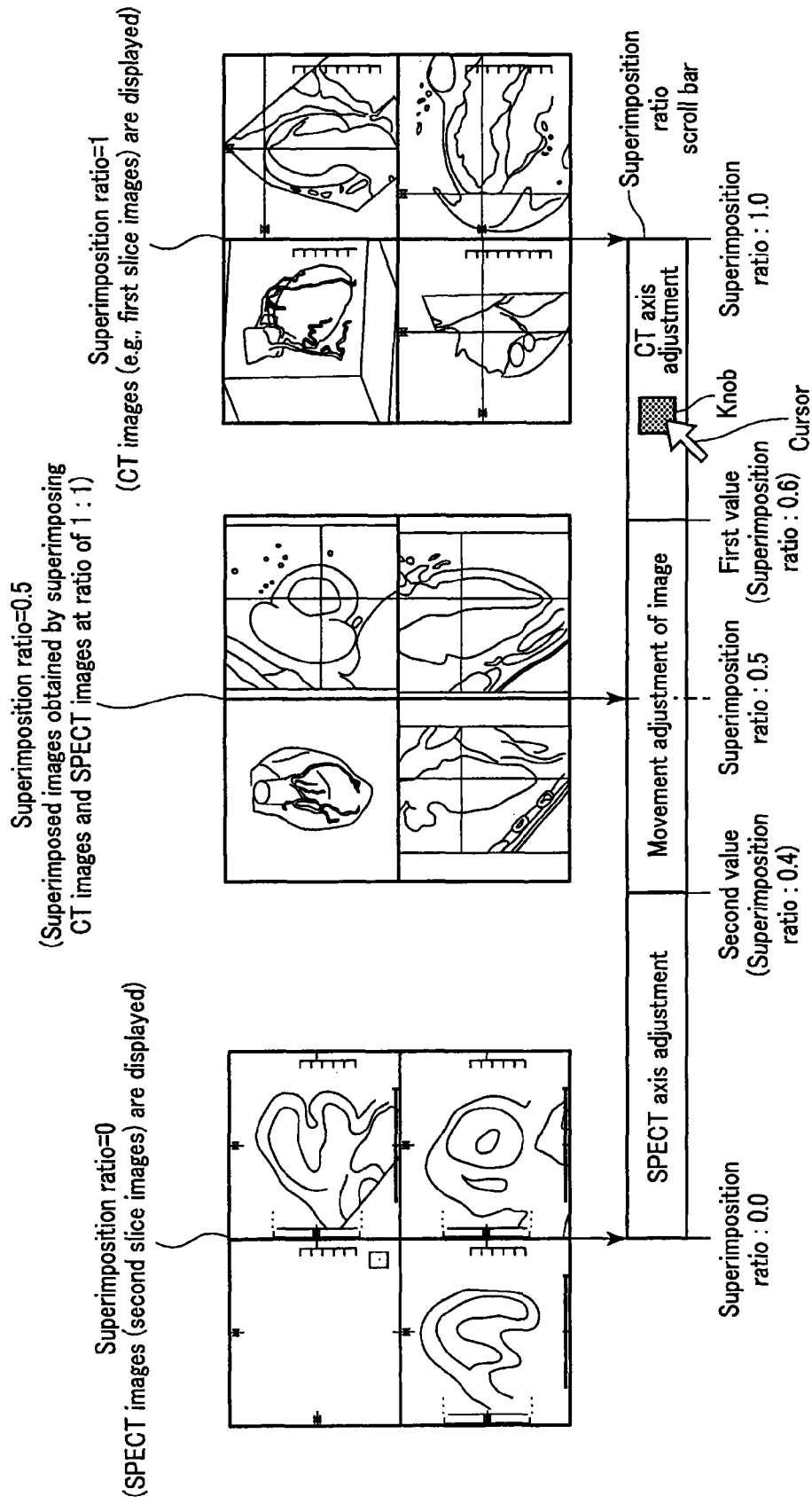
F I G. 11

MEDICAL IMAGE PROCESSING APPARATUS AND A MEDICAL IMAGE PROCESSING METHOD

CROSS-REFERENCE TO RELATED APPLICATIONS

This application is a Continuation application of PCT Application No. PCT/JP2014/064281, filed May 29, 2014 and based upon and claims the benefit of priority from the Japanese Patent Application No. 2013-114518, filed May 30, 2013; and No. 2013-168262, filed Aug. 13, 2013, the entire contents of all of which are incorporated herein by reference.

FIELD

Embodiments described herein relate generally to a medical image processing apparatus and a medical image processing method.

BACKGROUND

Conventionally, for example, in heart diagnosis, morphological information about the cardiac muscle and coronary artery, and functional information about the motion and ischemic condition are acquired using various modalities. The morphological information and the functional information are imaged and displayed. The imaged morphological information and functional information are used for heart diagnosis.

The morphological information and the functional information cannot be acquired by one imaging or one modality for an object. For a comprehensive diagnosis for the object and examination of a treatment plan, two images respectively corresponding to the morphological information and the functional information need to be associated with each other. This association is executed by collating morphological information and functional information that can be read from respective images.

More specifically, in the heart diagnosis, for example, a registration between a plurality of images is important to display a plurality of images respectively corresponding to morphological information and functional information at the same position on the same slice. The registration between a plurality of images is automatically executed by, for example, using the degree of correlation with teacher data (to be referred to as automatic registration processing hereinafter).

When the automatic registration processing fails or when the registration accuracy is low, an input operation for a registration by an operator is necessary. At this time, information about adjustment of a registration and the result of a registration need to be displayed to the operator.

However, in adjustment of a registration by the input operation of the operator, it is difficult to display information about adjustment of a registration, the result of a registration, and the like to the operator. In addition, the operability of adjustment of a registration is poor for the operator. These problems increase the burden of the input operation by the operator, and adjustment of a registration cannot be easily executed by the input operation of the operator. In addition, in the heart diagnosis, an entire region concerning the heart of an object may not fall within the scan region of an ultrasonic image. At this time, automatic registration processing may not be executed.

BRIEF DESCRIPTION OF THE DRAWINGS

FIG. 2 is a view showing three first slice images and a rendering image generated based on the first volume data according to the embodiment.

FIG. 3 is a view showing a superimposed schematic image together with one slice image out of the first slice images before inputting three landmarks according to the embodiment.

FIG. 9 is a view showing a superimposed image corresponding to a superimposition ratio together with a superimposition ratio scroll bar, a knob, and a cursor according to the first modification of the embodiment.

FIG. 11 is a view showing a superimposed image corresponding to a superimposition ratio together with the superimposition ratio scroll bar, the knob, and the cursor according to the second modification of the embodiment.

DETAILED DESCRIPTION

Figure 1:
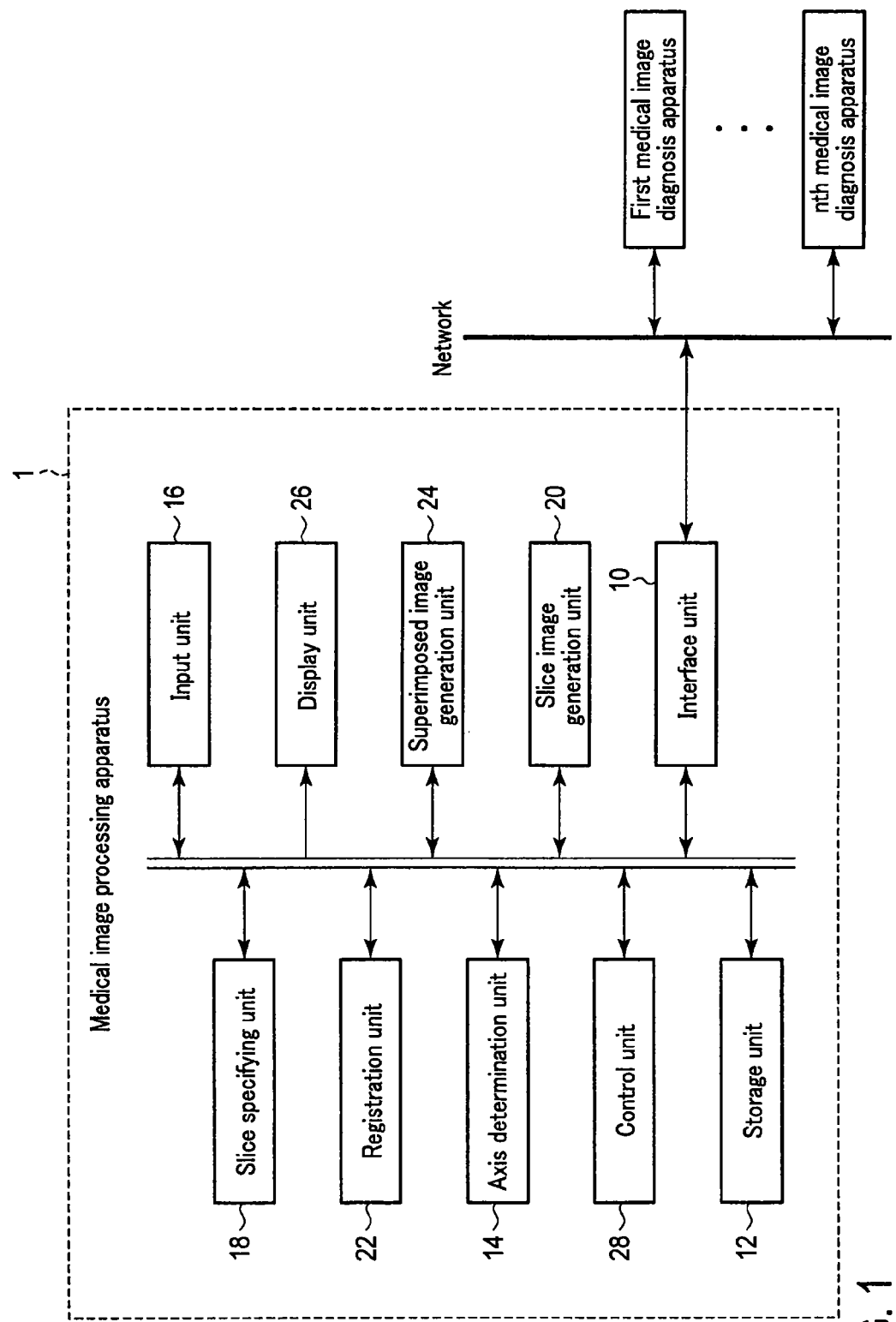
FIG. 1 is a block diagram showing an example of the arrangement of a medical image processing apparatus 1 according to an embodiment.

In general, according to one embodiment, a medical image processing apparatus includes input interface circuitry and processing circuitry. The input interface circuitry inputs at least three landmarks in a first slice image group and a second slice image group. The processing circuitry determines, in each of the first slice image group and the second slice image group, a first axis connecting two points out of the landmarks and a second axis that passes through another point different from the two points out of the landmarks and is orthogonal to the first axis. The processing circuitry performs a registration between a plurality of first slice images belonging to the first slice image group and a plurality of second slice images belonging to the second slice image group by using the first axis and the second axis in the first slice image group and the first axis and the second axis in the second slice image group.

A medical image processing apparatus according to an embodiment will now be described with reference to the accompanying drawings. Note that the same reference numerals denote constituent elements having almost the same functions and arrangements in the following description, and a repetitive description will be made only when required.

The embodiment will be explained below with reference to the accompanying drawings.

FIG. 1 is a block diagram showing an example of the arrangement of a medical image processing apparatus 1 according to the embodiment. The medical image processing apparatus 1 includes an interface unit (communication interface circuitry) 10, a storage unit (storage circuitry 12, processing circuitry (an axis determination unit (an axis determination program) 14, a slice specifying unit (a slice specifying program) 18, a slice image generation unit (a slice image generation program) 20, a registration unit (a registration program) 22, a superimposed image generation unit (a superimposed image generation program) 24), an input unit (input interface circuitry) 16, a display unit (display circuitry) 26, and a control unit (control circuitry) 28.

The interface unit 10 is connected to a plurality of medical image diagnostic apparatuses (first to nth medical image diagnostic apparatuses) via a network. The plurality of medical image diagnostic apparatuses are, e.g., an X-ray computed tomography (to be referred to as CT hereinafter) apparatus, a magnetic resonance imaging (to be referred to as MRI hereinafter) apparatus, an ultrasonic diagnostic apparatus, a nuclear medical diagnostic apparatus (e.g., a positron emission computed tomography (to be referred to as PET hereinafter) apparatus or a single photon emission computed tomography (to be referred to as SPECT hereinafter) apparatus), and an X-ray diagnostic apparatus.

The storage unit 12 stores a plurality of first slice images (first slice image group) corresponding to respective slices different from each other, and a plurality of second slice images (second slice image group) corresponding to the respective slices. The storage unit 12 stores the first volume data concerning the first slice image. The storage unit 12 stores the second volume data concerning the second slice image. The storage unit 12 stores the first rendering image having undergone rendering processing by a rendering processing unit (not shown, a rendering program in the processing circuitry) based on the first volume data. The storage unit 12 stores the second rendering image having undergone rendering processing by the rendering processing unit (not shown) based on the second volume data. The storage unit 12 stores a schematic view schematically showing the region of a predetermined organ.

The first slice image group and the second slice image group are assumed to be image groups generated by different modalities. The first volume data and the second volume data are assumed to be volume data generated by different modalities. The different modalities are, e.g., an X-ray CT apparatus and SPECT apparatus, or an ultrasonic diagnostic apparatus and SPECT apparatus.

To simplify the description, a plurality of slices mentioned above are three orthogonal slices concerning a predetermined organ in an object. To provide a detailed description below, the predetermined organ is, e.g., the heart. Note that the predetermined organ is not limited to the heart, and may be the brain, liver, or the like. The three orthogonal slices are assumed to be, e.g., three slices having the center of gravity of the heart. The three orthogonal slices are, e.g., an axial slice, coronal slice, and sagittal slice. When the predetermined organ is the heart, the schematic image is an image schematically showing the heart.

To provide a detailed description, the first volume data is assumed to be data reconstructed by the X-ray CT apparatus. The first volume data is transmitted to the storage unit 12 via a network connected to the X-ray CT apparatus and the interface unit 10 (to be described later), and is stored. The slice image generation unit 20 (to be described later) generates the first slice image based on the three orthogonal slices and the first volume data. A plurality of first slice images are an axial slice image, sagittal slice image, and coronal slice image concerning CT.

To provide a detailed description, the second volume data is assumed to be data reconstructed by the SPECT apparatus. Note that the second volume data may be volume data (ultrasonic volume data) generated by the ultrasonic diagnostic apparatus. Note that the imaging range in the ultrasonic volume data may not include the entire region of the predetermined organ. The second volume data is transmitted to the storage unit 12 via a network connected to the SPECT apparatus, and the interface unit 10 (to be described later), and is stored. The slice image generation unit 20 (to be described later) generates the second slice image based on the three orthogonal slices and the second volume data. A plurality of second slice images are an axial slice image, sagittal slice image, and coronal slice image concerning SPECT. Note that the plurality of second slice images may be a plurality of ultrasonic images generated by the ultrasonic diagnostic apparatus.

In the above description, the first volume data and the second volume data are volume data generated by different medical image diagnostic apparatuses, but may be volume data generated by the same medical image diagnostic apparatus. The same medical image diagnostic apparatus includes, e.g., identical SPECT apparatuses. At this time, the first slice image and the second slice image are slice images generated by the same medical image diagnostic apparatus. In addition, the first rendering image and the second rendering image are rendering images generated by the same medical image diagnostic apparatus. This situation is, e.g., a case in which the same object is imaged at different timings (e.g., before and after treatment), or a case in which volume data is compared with teacher data. At this time, the storage unit 12 stores teacher data, or two different volume data acquired by the same medical image diagnostic apparatus at different timings.

The medical image diagnostic apparatuses that acquire the first volume data and the second volume data may be arbitrary medical image diagnostic apparatuses that generate volume data. More specifically, according to the embodiment, processes such as two-axis adjustment registration processing and rendering processing (to be described later) can be applied to two volume data, two slice images, and two rendering images generated by arbitrary medical image diagnostic apparatuses.

The axis determination unit 14 determines the first axis connecting two points out of landmarks in the first slice image group and the second slice image group, and the second axis that passes through another point different from these two points out of the landmarks and is orthogonal to the first axis. More specifically, the axis determination unit 14 determines the first axis connecting two points out of three landmarks input from the input unit 16 (to be described later) in the first slice images and the second slice images, and the second axis that passes through another point different from these two points out of the three landmarks and is orthogonal to the first axis. When the predetermined organ is the heart, for example, the axis determination unit 14 determines, as the first axis, an axis connecting two landmarks (mitral valve and cardiac apex) input in a sagittal slice image out of three slice images among the first slice images and the second slice images. The axis determination unit 14 determines, as the second axis, an axis that passes through one landmark (left ventricular outflow) input in a coronal slice image out of the three slice images among the first slice images and the second slice images, and is orthogonal to the determined first axis.

The determined first and second axes are displayed on the display unit 26 (to be described later) together with the first slice images and second slice images. Note that the first axis displayed on the display unit 26 may be associated with the two landmarks (mitral valve and cardiac apex).

When at least one of the two landmarks (mitral valve and cardiac apex) concerning the first axis is moved by an input operation with the input unit 16 (to be described later), the axis determination unit 14 may determine a new first axis in accordance with the moved landmark. Also, when at least one of one landmark (left ventricular outflow) concerning the second axis and the first axis is moved by an input operation with the input unit 16 (to be described later), the axis determination unit 14 may determine a new second axis in accordance with the moved landmark.

The input unit 16 inputs various instructions, commands, information, selections, settings, and the like from the operator to the control unit 28 (to be described later). More specifically, the input unit 16 includes an input device such as a track ball, switch button, mouse, mouse wheel, or keyboard for inputting various instructions, commands, information, selections, settings, and the like mentioned above. Note that the input device may be a touch panel covering the display screen of the display unit 26.

In accordance with an instruction from the operator, the input unit 16 inputs at least three landmarks to three orthogonal slices concerning the heart displayed on the display unit 26 (to be described later). More specifically, the input unit 16 inputs three landmarks in the first and second slice images in accordance with an instruction from the operator. When the predetermined organ is the heart, the three landmarks are, e.g., the mitral valve, cardiac apex, and left ventricular outflow (for example, aortic valve).

Note that the input unit 16 also enables inputting an operation for adjusting the positions of three input landmarks (to be referred to as a landmark moving operation hereinafter). More specifically, first, the input unit 16 inputs an operation (e.g., a click operation to the mouse) of designating a slice image on which a landmark to undergo position adjustment is displayed. At this time, the input unit 16 may input an operation of moving the landmark to the designated slice image (e.g., an operation of moving the cursor of the mouse to the landmark, clicking, and then dragging the landmark).

The input unit 16 inputs an operation (e.g., a browsing operation with the mouse) for moving a designated slice image. When the slice image designated by the browsing operation is moved, the input unit 16 outputs, to the slice specifying unit 18 (to be described later), position information about the position of the moved slice image. Note that the input unit 16 can also input a drag concerning a landmark on the designated slice image after moving the slice image. Note that the first axis and second axis may be properly moved in accordance with movement of a landmark.

The input unit 16 can also input an operation of moving the first axis and second axis (to be referred to as an axis moving operation hereinafter). For example, the input unit 16 inputs an operation of moving the cursor of the mouse onto the first or second axis, and clicking. Accordingly, the axis to be moved is specified. Then, the input unit 16 inputs an operation of dragging the specified axis.

In the landmark moving operation and the axis moving operation, the moving target may be moved by translation, rotation, or the like. The input unit 16 can also input an operation (e.g., translation or rotation) of moving a slice image.

At least one slice image in the first slice images and the second slice images may be fixed and displayed independently of at least one operation out of the landmark moving operation and the axis moving operation. For example, coronal slice images in the first and second slice images are fixed and displayed independently of the moving operation of one landmark (left ventricular outflow) concerning the second axis (e.g., the short axis of the heart). That is, the coronal slice images in the first and second slice images are displayed in a non-rotation state independently of the moving operation of one landmark concerning the second axis.

When the landmark moving operation is input from the input unit 16, the slice specifying unit 18 specifies three new orthogonal slices with respect to the first volume data and the second volume data based on position information of the three landmarks and the newly determined first axis and second axis. The three new orthogonal slices are, e.g., the first slice including the three landmarks, the second slice that is orthogonal to the first axis and includes another landmark (left ventricular outflow), and the third slice that is orthogonal to the first slice and second slice and includes the first axis. The slice specifying unit 18 may specify three new orthogonal slices in accordance with the axis moving operation. The slice specifying unit 18 outputs the specified slices to the slice image generation unit 20 (to be described later). Note that the three slices specified by the slice specifying unit 18 are not limited to orthogonal ones. The slice specifying unit 18 can also specify three arbitrary slices by an input operation via the input unit 16 or the like.

Note that two slices out of three slices may be determined so that, for example, the first axis passes through the center (to be referred to as a display center hereinafter) of the slice image and is parallel to the longitudinal axis of the display screen. Also, two slices out of the three slices may be determined so that, for example, the second axis passes through the display center and is parallel to the longitudinal axis of the display screen.

The slice specifying unit 18 may specify, as a default second slice, a slice that is orthogonal to the first axis and has a point between the two landmarks (mitral valve and cardiac apex) concerning the first axis. For example, the slice specifying unit 18 specifies, as a default second slice, a slice that is orthogonal to the first axis and has the middle point of a line segment connecting the two landmarks (mitral valve and cardiac apex) concerning the first axis.

Note that the first to third slices may have different anatomical features. More specifically, when the predetermined organ is the heart, the first slice is a slice (to be referred to as a 4ch view hereinafter) including four chamber regions (right atrium, right ventricle, left atrium, and left ventricle: to be referred to as 4ch (chamber) hereinafter). That is, the anatomical feature of the first slice is 4ch. When the predetermined organ is the heart, the second slice is a slice (to be referred to as an SA image hereinafter) having the short axis (to be referred to as SA hereinafter) of the heart. That is, the anatomical feature of the second slice is SA. When the predetermined organ is the heart, the third slice is a slice (to be referred to as a 2ch view hereinafter) including two chamber regions (to be referred to as 2ch (chamber) hereinafter) out of the four chamber regions. That is, the anatomical feature of the third slice is 2ch.

The slice image generation unit 20 generates a plurality of third slice images respectively corresponding to the first to third slices based on the three orthogonal slices (first to third slices) specified by the slice specifying unit 18, and the first volume data. The slice image generation unit 20 generates a plurality of fourth slice images respectively corresponding to the first to third slices based on the three orthogonal slices (first to third slices) specified by the slice specifying unit 18, and the second volume data. The slice image generation unit 20 outputs the third slice images and the fourth slice images to the display unit 26. The third slice images are displayed on the display unit 26 (to be described later) together with the three landmarks, the first axis, and the second axis. The fourth slice images are displayed on the display unit 26 (to be described later) together with the three landmarks, the first axis, and the second axis.

The registration unit 22 performs a registration between the plurality of first slice images belonging to the first slice image group and the plurality of second slice images belonging to the second slice image group by using the first and second axes in the first slice image group and the first and second axes in the second slice image group. More specifically, the registration unit 22 performs the registration of the second slice images for the first slice images by using the first axis and second axis (to be referred to as the first axis set hereinafter) in the first slice images, and the first axis and second axis (to be referred to as the second axis set hereinafter) in the second slice images. The registration unit 22 may perform a registration of the fourth slice images for the third slice images by using the first axis set in the third slice images generated by the landmark moving operation or the axis moving operation, and the second axis set in the fourth slice images.

More specifically, the registration unit 22 determines a moving amount for making the first axis and second axis in the second axis set and the intersection point (to be referred to as the second axis intersection point hereinafter) between the first axis and the second axis coincide with the first axis and second axis in the first axis set and the intersection point (to be referred to as the first axis intersection point hereinafter) between the first axis and the second axis.

The moving amount includes, e.g., a translation amount and a rotation amount. Based on the translation amount and the rotation amount, the registration unit 22 determines a parameter for transforming a coordinate system (to be referred to as the first coordinate system hereinafter) concerning the second slice images (or fourth slice images) into a coordinate system (to be referred to as the second coordinate system hereinafter) concerning the first slice images (or third slice images). The parameter is, e.g., the transformation matrix of the second coordinate system with respect to the first coordinate system. By determining the transformation matrix, the registration unit 22 completes the registration of the second slice images for the first slice images. The registration unit 22 outputs the transformation matrix to the superimposed image generation unit 24 (to be described later).

The superimposed image generation unit 24 generates a plurality of superimposed images by superimposing the second slice images respectively on the first slice images using the transformation matrix. Note that the superimposed image generation unit 24 may generate a plurality of superimposed images by superimposing the fourth slice images respectively on the third slice images using the transformation matrix. In the following description, the plurality of superimposed images are images obtained by superimposing the second slice images respectively on the first slice images.

More specifically, the superimposed image generation unit 24 generates an axial slice superimposed image by superimposing an axial slice image in the second slice images on an axial slice image in the first slice images using the transformation matrix. The superimposed image generation unit 24 generates a sagittal slice superimposed image by superimposing a sagittal slice image in the second slice images on a sagittal slice image in the first slice images using the transformation matrix. The superimposed image generation unit 24 generates a coronal slice superimposed image by superimposing a coronal slice image in the second slice images on a coronal slice image in the first slice images using the transformation matrix. The plurality of superimposed images are, e.g., the above-described axial slice superimposed image, sagittal slice superimposed image, and coronal slice superimposed image.

When a superimposition ratio indicating a ratio at which each second slice image is superimposed on a' corresponding first slice image is input via the input unit 16, the superimposed image generation unit 24 may generate a superimposed image corresponding to the superimposition ratio. The superimposed image generation unit 24 outputs a plurality of generated superimposed images to the display unit 26. For example, when the superimposition ratio is 0.5, the first slice image (or third slice image) and the second slice image (or fourth slice image) are superimposed at 1:1. When the superimposition ratio is 1, the superimposed image coincides with the first slice image without superimposing the second slice image on the first slice image. When the superimposition ratio is 0, the superimposed image coincides with the second slice image without displaying the first slice image.

The superimposed image generation unit 24 generates a superimposed schematic image by superimposing the positions of the three landmarks, the position of the first axis, and the position of the second axis on a schematic image. When input of the three landmarks, the landmark moving operation, or the axis moving operation is performed via the input unit 16, the superimposed image generation unit 24 may newly generate a superimposed schematic image based on position information of the landmarks and the determined first axis and second axis. The superimposed image generation unit 24 outputs the generated superimposed schematic image to the display unit 26 at a size smaller than the first slice image and the second slice image, together with the first slice image and the second slice image. Note that the superimposed schematic image may be displayed as a guide for inputting the three landmarks or the first axis and second axis, together with the first slice image and second slice image before inputting the three landmarks.

The display unit 26 displays the first slice images together with the three landmarks, the first axis, and the second axis. The display unit 26 displays the second slice images together with the three landmarks, the first axis, and the second axis. When the landmark moving operation or the axis moving operation is input via the input unit 16, the display unit 26 displays the third slice images together with the three landmarks, the first axis, and the second axis. In addition, the display unit 26 displays the fourth slice images together with the three landmarks, the first axis, and the second axis.

In accordance with anatomical features concerning slice images, the display unit 26 may determine in advance display regions where respective slice images in the first to fourth slice images are displayed. Note that the position of the display region complying with the anatomical feature can be properly changed via the input unit 16. For example, the display unit 26 assigns slice images corresponding to respective anatomical features, to respective partial regions obtained by vertically and horizontally dividing the display region into four, and then displays the slice images. For example, the display unit 26 displays a slice image having the anatomical feature "4ch" in the lower left region of the display region. The display unit 26 displays a slice image having the anatomical feature "SA" in the upper left region of the display region. The display unit 26 displays a slice image having the anatomical feature "2ch" in the upper right region of the display region. The display unit 26 displays a rendering image in the lower right region of the display region. Even if the landmark moving operation or the axis moving operation is input via the input unit 16, the display unit 26 displays a plurality of slice images while maintaining the display positions corresponding to the anatomical features. Therefore, the display unit 26 can display a plurality of slice images respectively in a plurality of partial regions respectively associated with a plurality of anatomical features. That is, slice images having different anatomical features are displayed in respective partial regions on the display unit 26.

FIG. 2 is a view showing three first slice images and a rendering image generated based on the first volume data. As shown in FIG. 2, the three first slice images are a first axial slice image A, a first coronal slice image C, and a first sagittal slice image S. A superimposed schematic image obtained by superimposing the three landmarks, the first axis, and the second axis on a schematic image schematically representing the heart is displayed on each of the three slice images.

A landmark M is input at the position of the mitral valve in the first axial slice image A in FIG. 2. The landmark M is indicated by a striped circle. In addition, a landmark Ao is input at the position of the left ventricular outflow (or aortic valve) in the first axial slice image A. In FIG. 2, the landmark Ao is indicated by a hatched circle.

As shown in FIG. 2, the landmark M is input at the position of the mitral valve in the first sagittal slice image S. In addition, a landmark Ap is input at the position of the cardiac apex in the first sagittal slice image S, as shown in FIG. 2. In FIG. 2, the landmark Ap is indicated by a horizontally lined circle.

The landmark M is input at the position of the mitral valve in the first coronal slice image C in FIG. 2. In addition, the landmark Ap is input at the position of the cardiac apex in the first coronal slice image C, as shown in FIG. 2. In FIG. 2, the landmark Ao is input at the position of the left ventricular outflow (or aortic valve) in the first coronal slice image C.

In FIG. 2, the displays of the three landmarks are represented by the difference in the texture of the inside of the circle. In practice, the difference between the three landmarks may be displayed by the color, line type (e.g., solid line, broken line, and chain line), thickness, or the like. In FIG. 2, the first axis and the second axis are indicated by black solid lines. In practice, the difference between the two axes may be displayed by the color, line type (e.g., solid line, broken line, and chain line), thickness, or the like.

FIG. 3 is a view showing a superimposed schematic image together with one slice image out of the first slice images before inputting the three landmarks. As shown in FIG. 3, the superimposed schematic image is displayed as the navigation for inputting the three landmarks.

Figure 4:
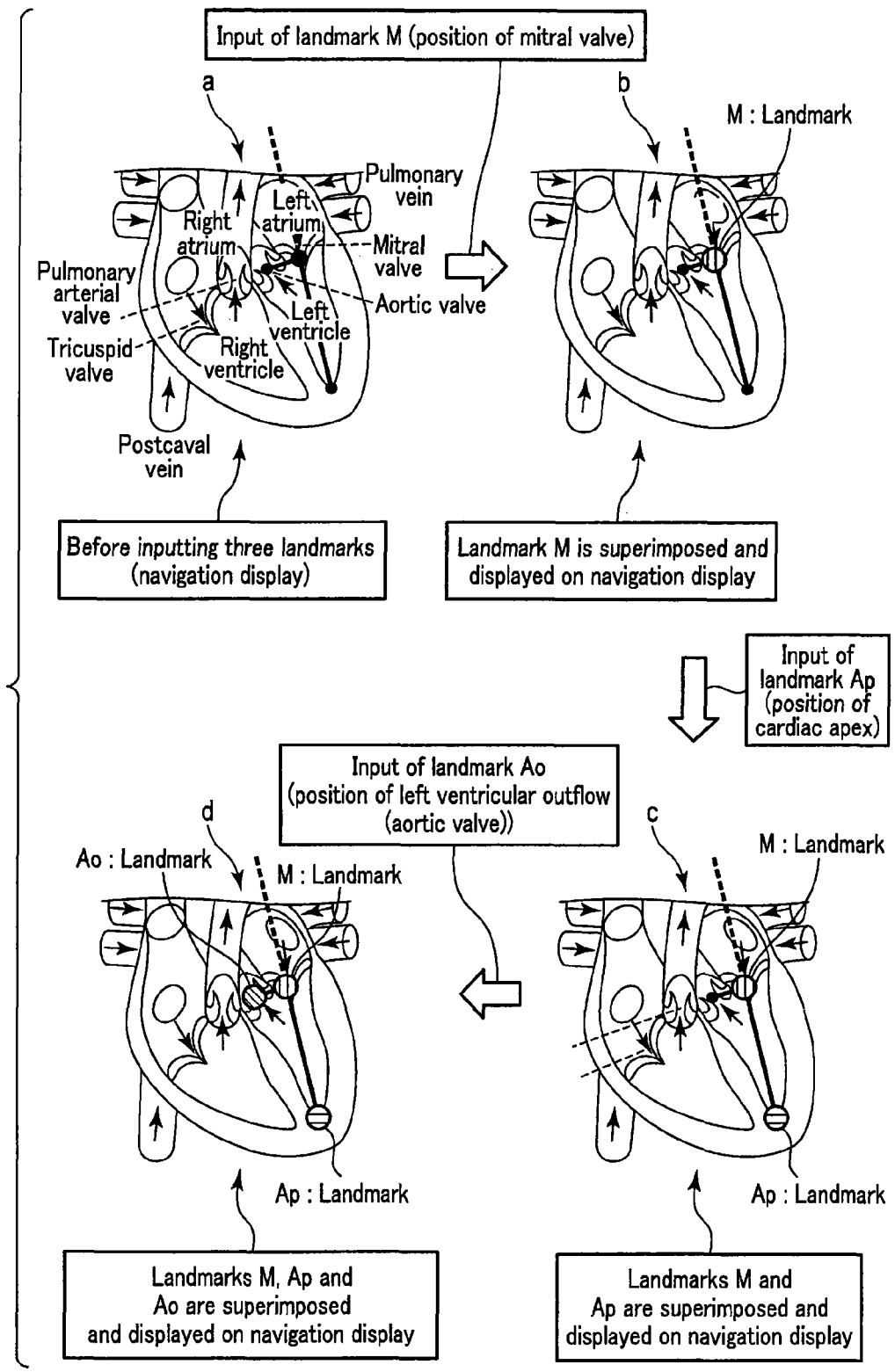
FIG. 4 is a view showing an example in which the superimposed schematic image is updated in accordance with input of three respective landmarks according to the embodiment.

FIG. 4 is a view showing an example in which the superimposed schematic image is updated in accordance with input of the three respective landmarks. In FIG. 4, a represents a superimposed schematic image (navigation display) before inputting the three landmarks.

When the landmark M (position of the mitral valve) is input in the first slice image or the second slice image, the landmark M is superimposed and displayed on the navigation display, as represented by b of FIG. 4. When the landmark Ap (position of the cardiac apex) is input in the first slice image or the second slice image, the landmarks M and Ap are superimposed and displayed on the navigation display, as represented by c of FIG. 4. When the landmark Ao (position of the left ventricular outflow (aortic valve)) is input in the first slice image or the second slice image, the landmarks M and Ap are superimposed and displayed on the navigation display, as represented by d of FIG. 4.

Note that FIG. 4 shows a plurality of superimposed schematic images corresponding to the order in which the position of the mitral valve is input, then the position of the cardiac apex is input, and the position of the left ventricular outflow (aortic valve) is input finally. In the embodiment, the input order is not limited to the input order of the three landmarks and is arbitrary.

Figure 5:
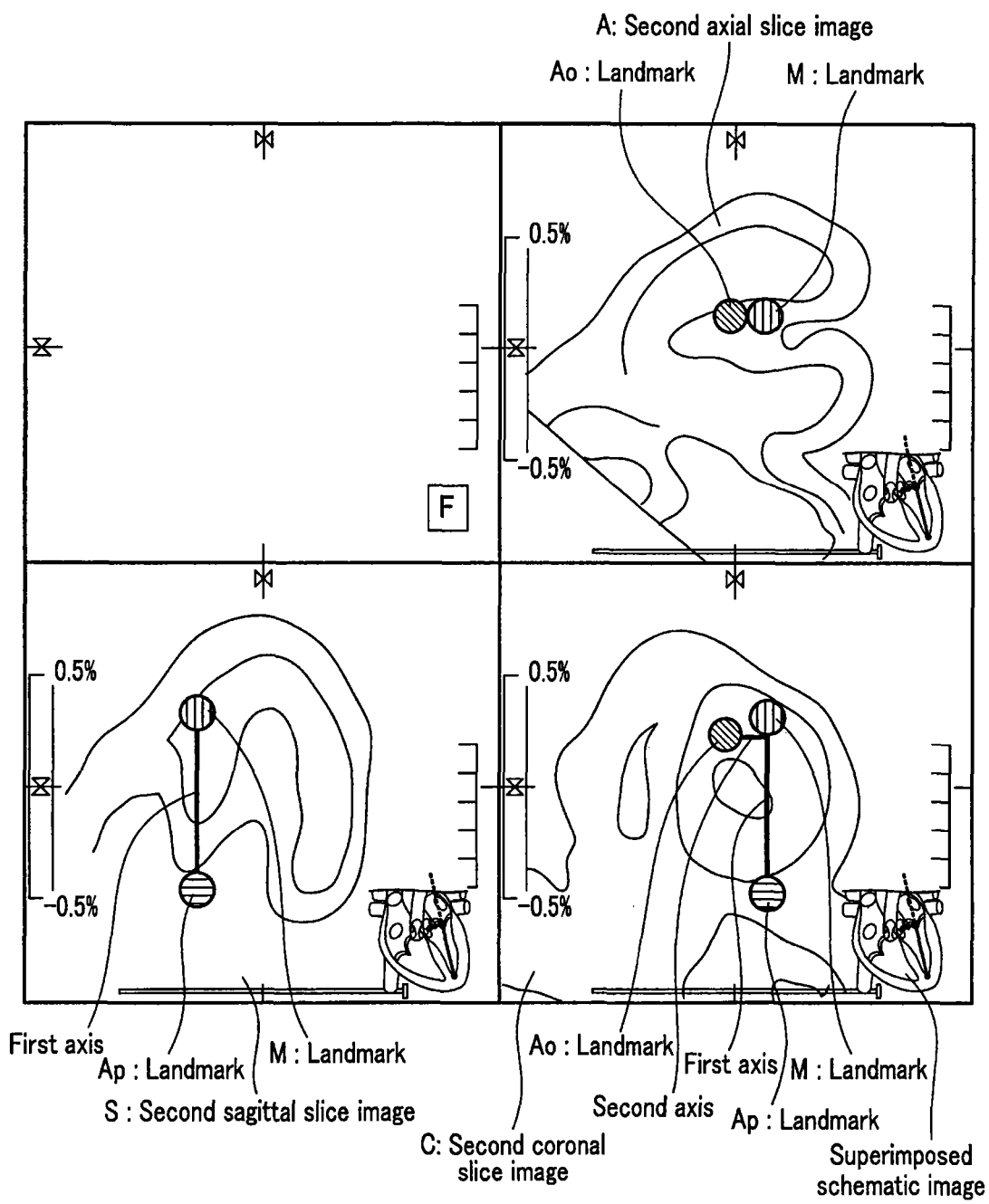
FIG. 5 is a view showing an example of three second slice images generated based on the second volume data according to the embodiment.

FIG. 5 is a view showing an example of three second slice images generated based on the second volume data. Note that a rendering image generated based on the second volume data is not shown in FIG. 5. As shown in FIG. 5, the three second slice images are a second axial slice image A, a second coronal slice image C, and a second sagittal slice image S. A superimposed schematic image obtained by superimposing the three landmarks, the first axis, and the second axis on a schematic image schematically representing the heart is displayed in each of the three slice images.

The landmark M is input at the position of the mitral valve in the second axial slice image A in FIG. 5. The landmark M is indicated by a striped circle. In addition, the landmark Ao is input at the position of the left ventricular outflow (or aortic valve) in the second axial slice image A. In FIG. 5, the landmark Ao is indicated by a hatched circle.

As shown in FIG. 5, the landmark M is input at the position of the mitral valve in the second sagittal slice image S. In addition, the landmark Ap is input at the position of the cardiac apex in the second sagittal slice image S, as shown in FIG. 5. In FIG. 5, the landmark Ap is indicated by a horizontally lined circle.

The landmark M is input at the position of the mitral valve in the second coronal slice image C in FIG. 5. In addition, the landmark Ap is input at the position of the cardiac apex in the second coronal slice image C, as shown in FIG. 5. As shown in FIG. 5, the landmark Ao is input at the position of the left ventricular outflow (or aortic valve) in the first coronal slice image C.

In FIG. 5, the displays of the three landmarks are represented by the difference in the texture of the inside of the circle. In practice, the difference between the three landmarks may be displayed by the color, line type (e.g., solid line, broken line, and chain line), thickness, or the like. In FIG. 5, the first axis and the second axis are indicated by black solid lines. In practice, the difference between the two axes may be displayed by the color, line type (e.g., solid line, broken line, and chain line), thickness, or the like.

Note that the display contents in FIGS. 2 and 5 can be appropriately switched via an operation from the input unit 16.

Figure 6:
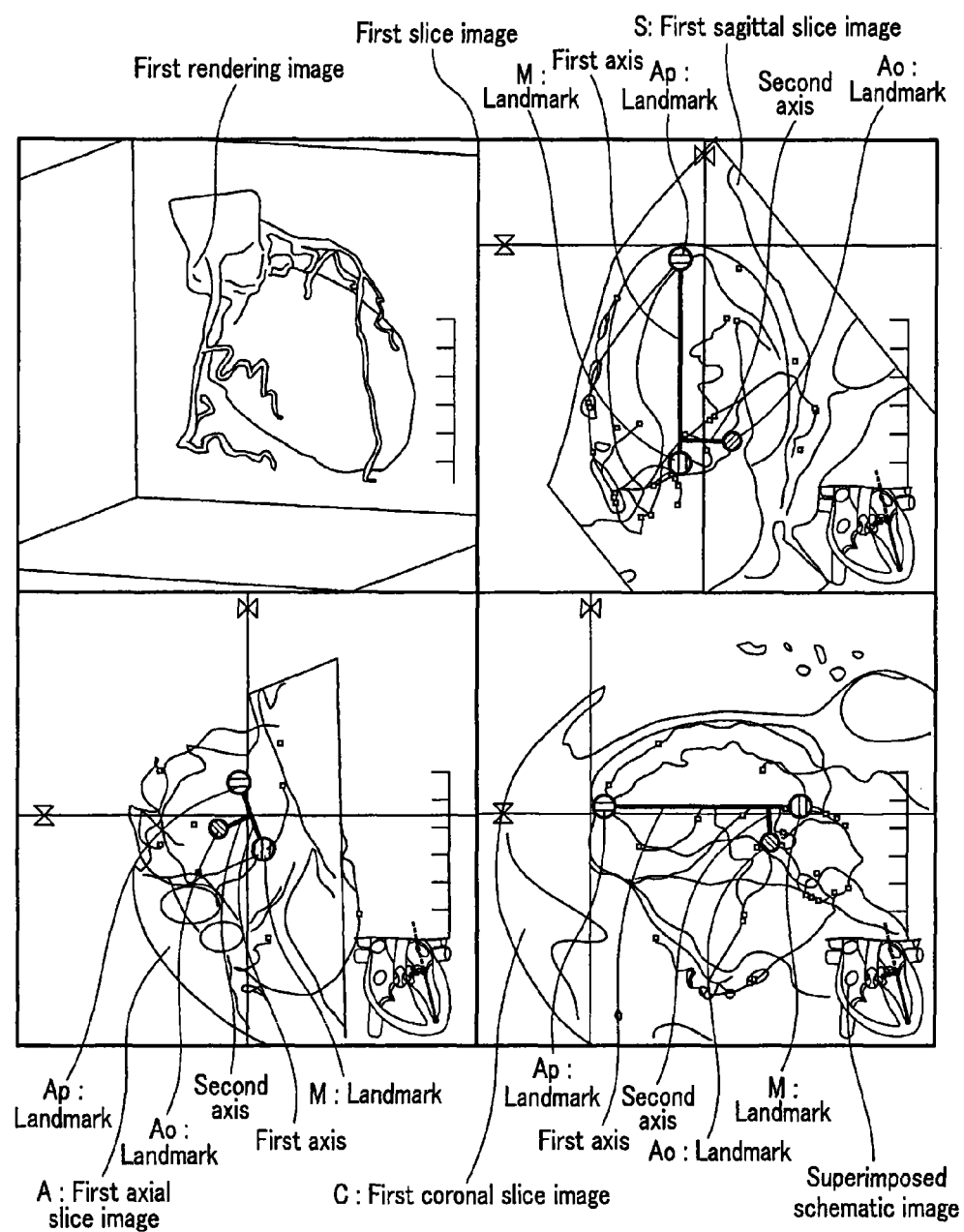
FIG. 6 is a view showing an example of the representation of the direction of the heart axis (first axis) in each first slice image according to the embodiment.

FIG. 6 is a view showing an example of the representation of the direction of the heart axis (first axis) in each first slice image. The direction of the heart axis is indicated by the two landmarks (landmarks M and Ap) at the two ends of the first axis. The landmarks M and Ap may always be displayed, or they may be displayed when the position of the cursor synchronized with the motion of the mouse comes close to at least one of the two landmarks.

Figure 7:
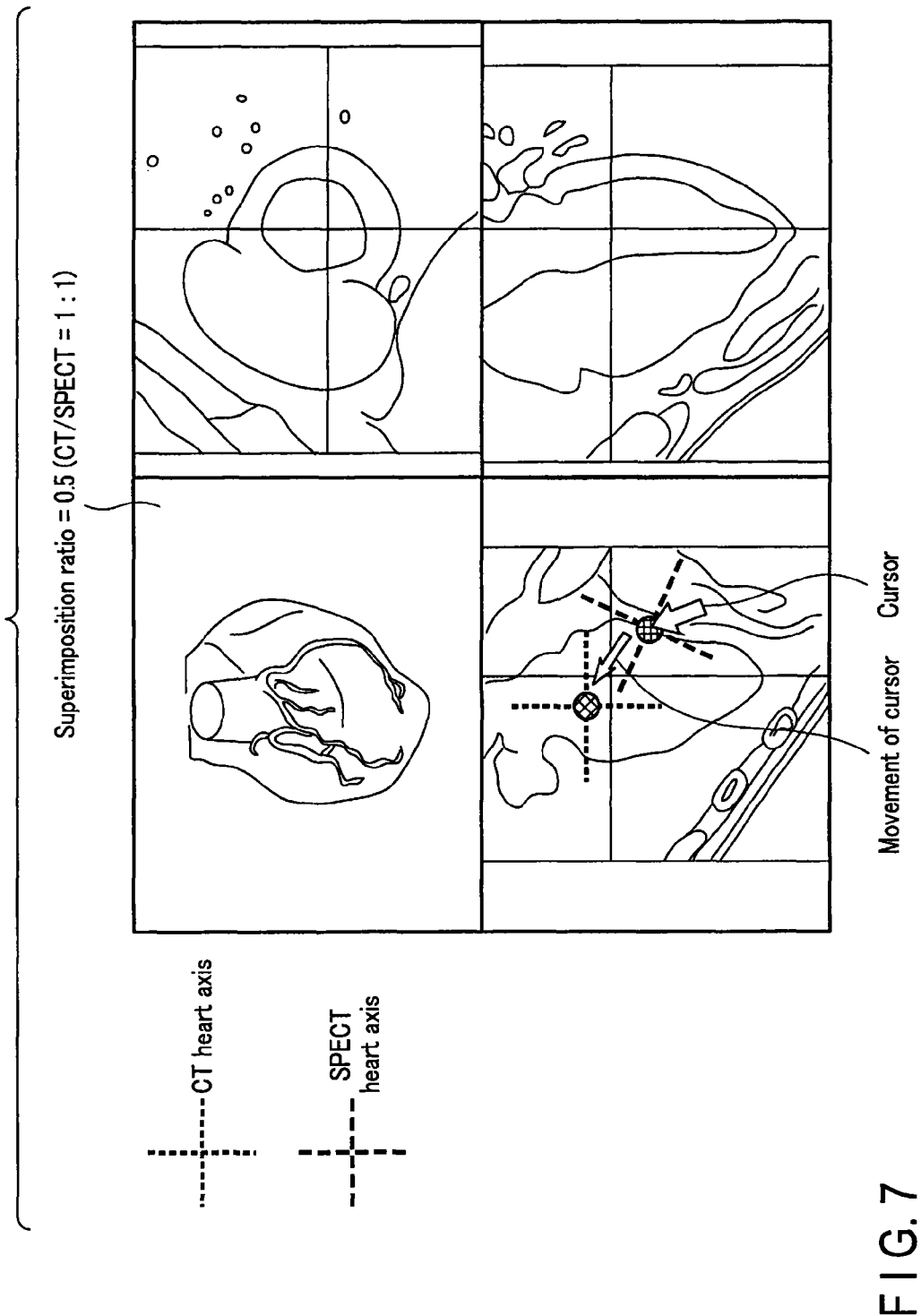
FIG. 7 is a view showing an example of a registration between a CT heart axis and the first axis intersection point in the first slice image, and a SPECT heart axis and the second intersection point in the second slice image at a superimposition ratio of 0.5 according to the embodiment.

FIG. 7 is a view showing an example of a registration between the first axis set (to be referred to as a CT heart axis hereinafter) and the first axis intersection point in a CT slice image, and the second axis set (to be referred to as a SPECT heart axis hereinafter) and the second intersection point in a SPECT slice image at a superimposition ratio of 0.5 (CT slice image (first or third slice image) and SPECT slice image (second or fourth slice image)). As shown in FIG. 7, the second axis intersection point is designated by the cursor (drag), and the cursor is moved to move the second axis intersection point to the first axis intersection point. Along with the movement of the cursor, the second axis intersection point is moved to the first axis intersection point. When the first axis intersection point and the second axis intersection point coincide with each other, a registration between the first axis set and the second axis set is performed. Note that the first axis intersection point may be moved to the second axis intersection point.

The control unit 28 includes a central processing unit (to be referred to as a CPU hereinafter), a memory, and the like (none are shown). The control unit 28 functions as the center of the medical image processing apparatus 1. More specifically, the control unit 28 reads out a control program or the like from the storage unit 12 in accordance with an input operation input via the input unit 16, and loads it in the memory of the control unit 28. By executing the loaded control program, the control unit 28 controls each unit of the medical image processing apparatus 1.

Figure 13:
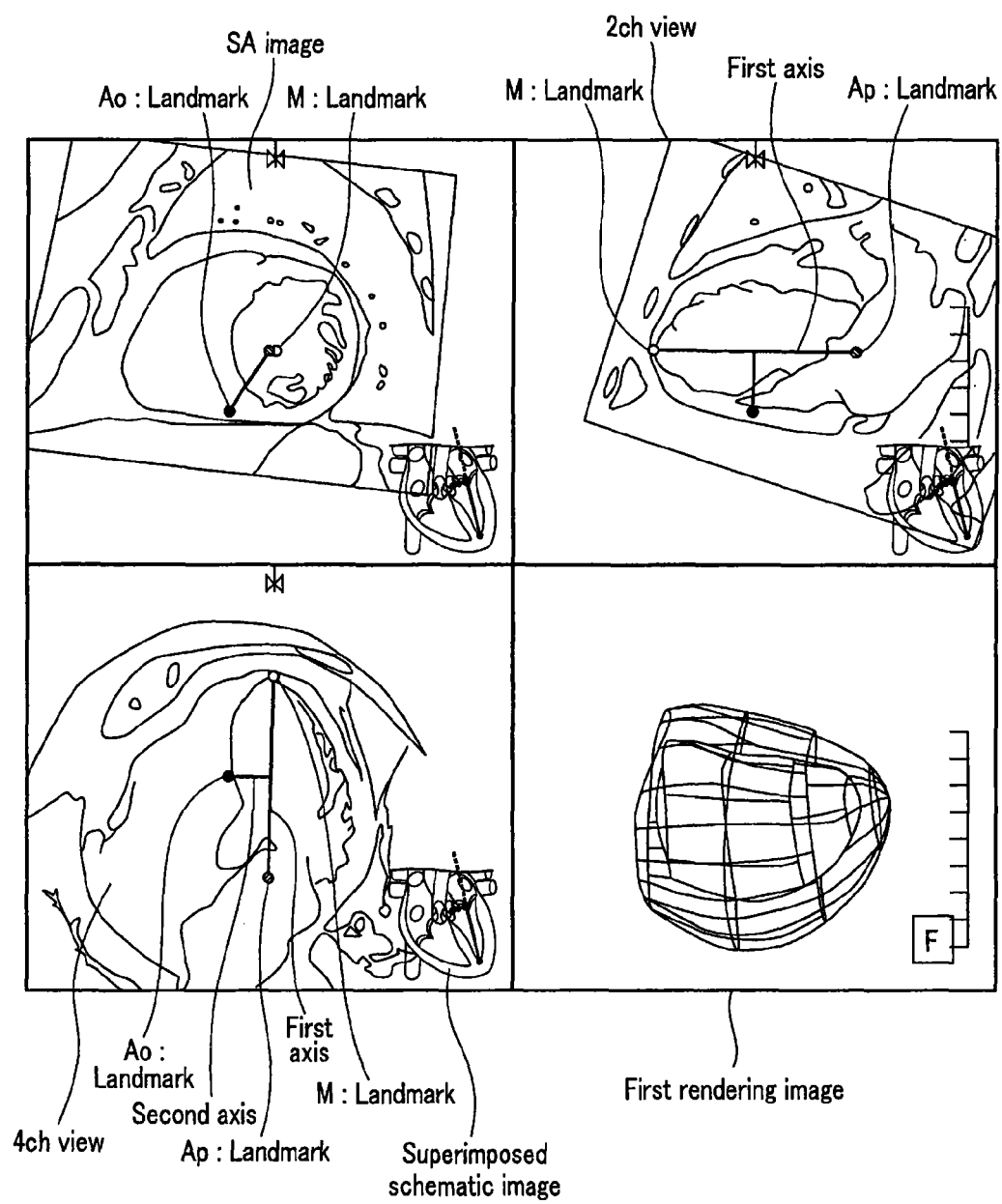
FIG. 13 is a view showing an example in which a slice image is displayed in a partial region in accordance with an anatomical feature according to the embodiment.

FIG. 13 is a view showing an example in which a slice image is displayed in a partial region in accordance with an anatomical feature. As shown in FIG. 13, a 4ch view (coronal slice image) is displayed in the lower left partial region of the display region. As shown in FIG. 13, an SA image (axial slice image) is displayed in the upper left partial region of the display region. As shown in FIG. 13, a 2ch view (sagittal slice image) is displayed in the upper right partial region of the display region. Even if the landmark moving operation or the axis moving operation is input via the input unit 16, the display unit 26 maintains the display positions of the 4ch view, 2ch view, and SA image.

(Two-Axis Adjustment Registration Function)

A two-axis adjustment registration function is a function of performing a registration of the second slice images for the first slice images by adjusting and performing a registration between the first axis set determined based on the three landmarks input on the first slice images, and the second axis set determined based on the three landmarks input on the second slice images. Processing (to be referred to as two-axis adjustment registration processing hereinafter) concerning the two-axis adjustment registration function will be explained. The processing circuitry performs a program (two-axis adjustment registration processing program) concerning the two-axis adjustment registration processing.

Figure 8:
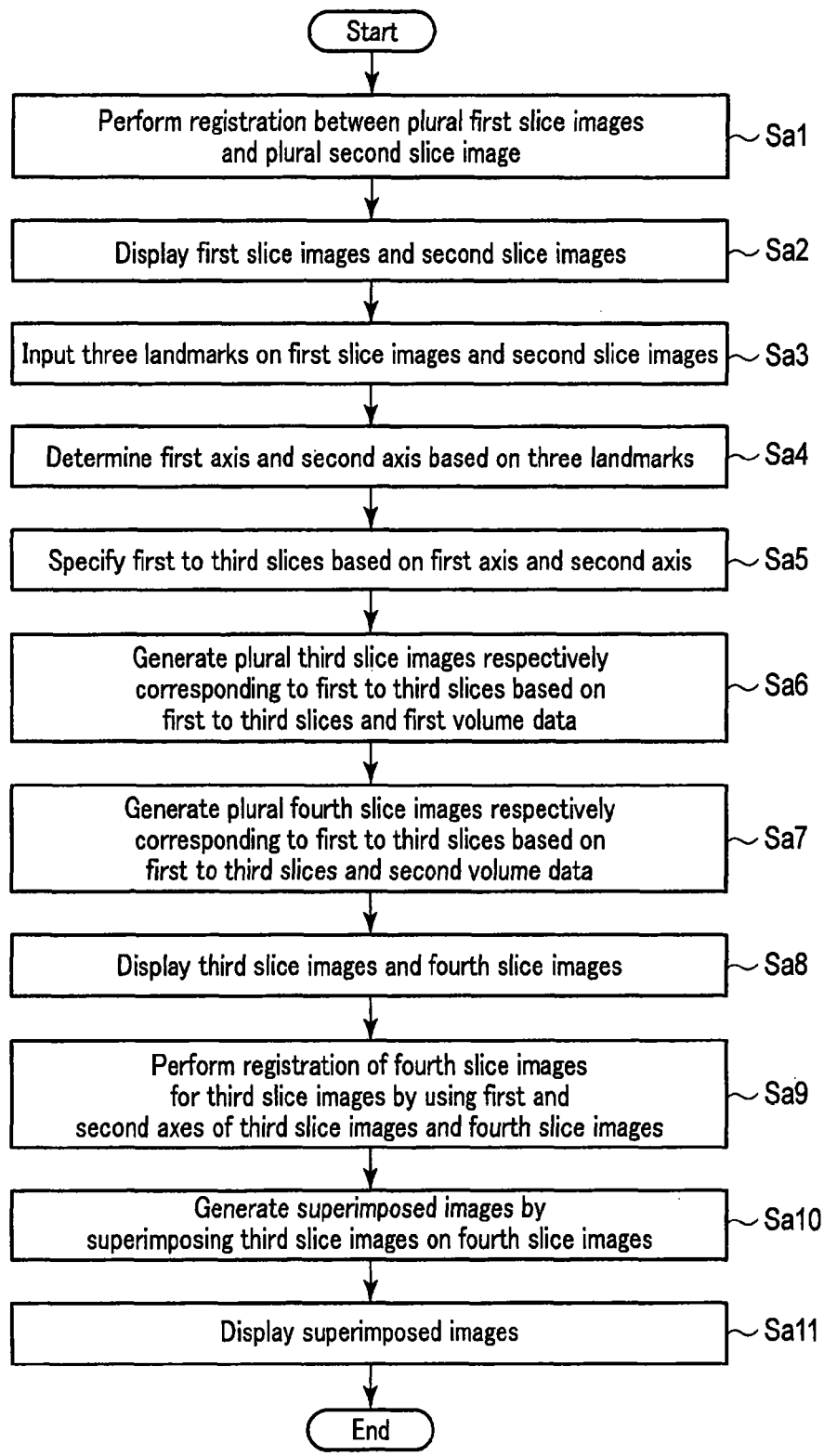
FIG. 8 is a flowchart showing an example of the processing procedures of two-axis adjustment registration processing according to the embodiment.

FIG. 8 is a flowchart showing an example of the processing procedures of the two-axis adjustment registration processing.

A registration between a plurality of first slice images and a plurality of second slice images is performed by the processing circuitry (step Sa1). The registration in step Sa1 is automatic registration by, e.g., pattern matching or correlation matching. The first slice images and the second slice images are displayed on the display unit 26 (step Sa2). The three landmarks are input on the first slice images and the second slice images (step Sa3). The first axis and the second axis are determined based on the three landmarks (step Sa4).

The first to third slices are specified based on the first axis and the second axis (step Sa5). A plurality of third slice images respectively corresponding to the first to third slices are generated based on the first to third slices and the first volume data (step Sa6). A plurality of fourth slice images respectively corresponding to the first to third slices are generated based on the first to third slices and the second volume data (step Sa7).

The third slice images and the fourth slice images are displayed on the display unit 26 (step Sa8). A registration of the fourth slice images is performed for the third slice images by using the first axis set and first axis intersection point concerning the third slice images, and the second axis set and second axis intersection point concerning the fourth slice images (step Sa9). By this registration, a transformation matrix is determined. A superimposition ratio is input via the input unit 16. The fourth slice images are superimposed on the third slice images at the input superimposition ratio, thereby generating superimposed images (step Sa10). The superimposed images are displayed (step Sa11).

(First Modification)

The first modification is different from the embodiment in that the first modification provides an input state in which the first axis set in the first slice images or the second axis set in the second slice images can be adjusted.

The display unit 26 displays, together with a superimposed image, a superimposition ratio at which the second slice image is superimposed on the first slice image. More specifically, the display unit 26 displays, e.g., a superimposition ratio scroll bar for scrolling the superimposition ratio. The display unit 26 displays, on the superimposition ratio scroll bar, a knob indicating the superimposition ratio of a displayed superimposed image. The display unit 26 outputs, to the superimposed image generation unit 24 and the input unit 16, the superimposition ratio corresponding to the position of the knob on the superimposition ratio scroll bar.

The superimposed image generation unit 24 generates a superimposed image corresponding to the superimposition ratio corresponding to the position of the knob on the superimposition ratio scroll bar displayed on the display unit 26.

The storage unit 12 stores a predetermined value concerning an input of adjustment of either of the first axis set and second axis set. The predetermined value is, e.g., 0.5 (value at which the first slice image and the second slice image are superimposed at 1:1). Note that the predetermined value can be properly changed via the input unit 16.

The input unit 16 inputs the position of the knob on the superimposition ratio scroll bar. More specifically, the input unit 16 moves the position of the knob on the superimposition ratio scroll bar with, e.g., the cursor. The input unit 16 changes to a state in which an input for position adjustment of the first axis set or second axis set is possible in accordance with the position of the knob.

More specifically, when the superimposition ratio corresponding to the position of the knob is equal to or higher than the predetermined value, the input unit 16 changes to a state in which adjustment of the first axis set, i.e., the first axis and second axis determined on the first slice image is possible. That is, when the position (superimposition ratio) of the knob is equal to or higher than the predetermined value, the input unit 16 changes to a state in which the first axis and second axis (e.g., heart axis on a CT image) on the first slice image can be edited.

When the superimposition ratio corresponding to the position of the knob is lower than the predetermined value, the input unit 16 changes to a state in which the position of the second axis set, i.e., the positions of the first axis and second axis determined on the second slice image can be adjusted. That is, when the position (superimposition ratio) of the knob is lower than the predetermined value, the input unit 16 changes to a state in which the first axis and second axis (e.g., heart axis on a SPECT image) on the second slice image can be edited.

That is, the first axis set and second axis set to be adjusted can be switched in accordance with the position of the knob input from the input unit 16. At this time, the display unit 26 displays, together with the adjustment target axis set, a superimposed image having a superimposition ratio corresponding to the position of the knob.

FIG. 9 is a view showing a superimposed image corresponding to a superimposition ratio together with the superimposition ratio scroll bar, the knob, and the cursor. As shown in FIG. 9, for example, when the knob on the superimposition ratio scroll bar is positioned between the predetermined value (superimposition ratio=0.5) and a superimposition ratio of 1, the first axis set (first axis and second axis) on the first slice image can be adjusted (CT axis adjustment) via the input unit 16. When the knob on the superimposition ratio scroll bar shown in FIG. 9 is positioned between the predetermined value (superimposition ratio=0.5) and a superimposition ratio of 0, the second axis set (first axis and second axis) on the second slice image can be adjusted (SPECT axis adjustment) via the input unit 16.

Figure 14:
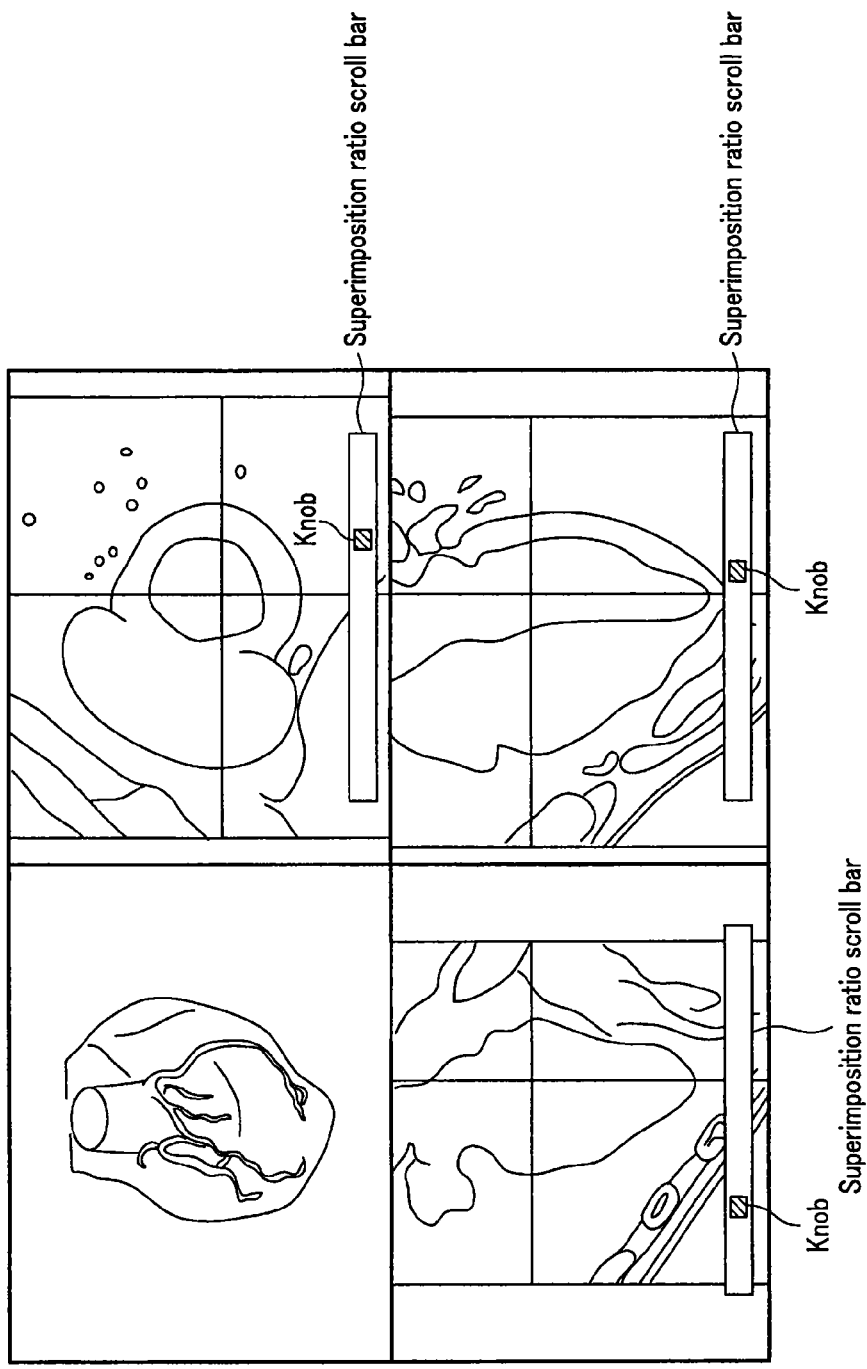
FIG. 14 is a view showing an example in which superimposition ratio scroll bars and knobs are displayed on respective slice images according to the embodiment.

FIG. 14 is a view showing an example in which superimposition ratio scroll bars and knobs are displayed on respective slice images. As shown in FIG. 14, the superimposition ratio scroll bars and the knobs are displayed in three respective slice images. By moving the positions of the knobs in the respective slice images, the superimposition ratios in the first and second slice images can be changed.

(Axis Adjustment Input Function)

The axis adjustment input function is to provide a state in which an input concerning adjustment of the first axis set or second axis set is possible in accordance with an input superimposition ratio. Processing (to be referred to as axis adjustment input processing hereinafter) concerning the axis adjustment input function will be explained. The processing circuitry performs a program (axis adjustment input program) concerning the axis adjustment input processing.

Figure 10:
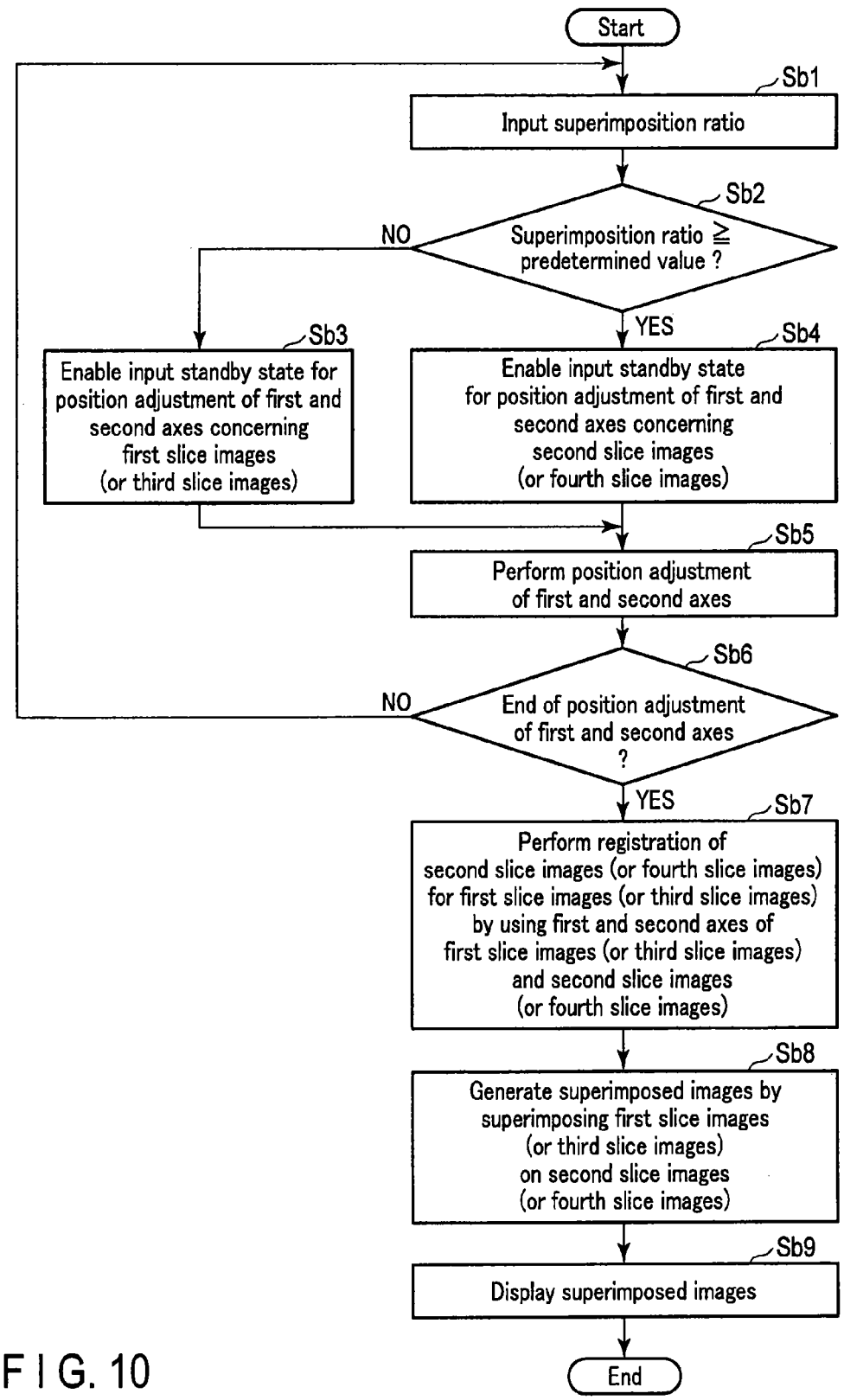
FIG. 10 is a flowchart showing an example of the procedures of axis adjustment input processing according to the first modification of the embodiment.

FIG. 10 is a flowchart showing an example of the procedures of the axis adjustment input processing. The flowchart in FIG. 10 corresponds to processes in step Sa9 and subsequent steps of the flowchart in FIG. 8. For example, the flowchart in FIG. 10 may be used in place of the processes in steps Sa9 and Sa10 of the flowchart in FIG. 8.

A superimposition ratio on the superimposition ratio scroll bar is input via the input unit 16 (step Sb1). If the input superimposition ratio is equal to or higher than a predetermined value (step Sb2), an input standby state for position adjustment of the first and second axes (first axis set) concerning the first slice images (or third slice images) is enabled (step Sb3). If the input superimposition ratio is lower than the predetermined value (step Sb2), an input standby state for position adjustment of the first and second axes (second axis set) concerning the second slice images (or fourth slice images) is enabled (step Sb4).

The first axis and second axis in the first axis set or second axis set are adjusted via the input unit 16 (step Sb5). If the position adjustment of the first and second axes has not ended (step Sb6), the processes in steps Sb1 to Sb5 are repeated. If the position adjustment of the first axis and second axis has ended (step Sb6), a registration of the second slice images (or fourth slice images) is performed for the first slice images (or third slice images) by using the first and second axes of the first slice images (or third slice images) and second slice images (or fourth slice images) (step Sb7).

Superimposed images are generated by superimposing the first slice images (or third slice images) on the second slice images (or fourth slice images) (step Sb8). At this time, a superimposition ratio concerning the superimposed image may be newly input via the input unit 16, or a superimposition ratio finally input in step Sb1 may be used. The generated superimposed images are displayed on the display unit 26 (step Sb9).

(Second Modification)

The second modification is different from the embodiment and the first modification in that the second modification provides an input state in which any one of the first axis set, the second axis set, the first slice images, and the second slice images can be adjusted in accordance with the value of the superimposition ratio.

The storage unit 12 stores the first value and second value concerning an input of adjustment of any one of the first axis set, the second axis set, the first slice images, and the second slice images. The first value is larger than the second value. The first value is, e.g., 0.6 (superimposition ratio at which the first slice image is superimposed at a ratio of 0.6 and the second slice image is superimposed at a ratio of 0.4). The second value is, e.g., 0.4 (superimposition ratio at which the first slice image is superimposed at a ratio of 0.4 and the second slice image is superimposed at a ratio of 0.6). Note that the first and second values can be properly changed via the input unit 16.

The input unit 16 inputs the position of the knob on the superimposition ratio scroll bar. The input unit 16 changes to a state in which an input for position adjustment of the first axis set, second axis set, first slice image, or second slice image is possible in accordance with the position of the knob.

More specifically, when the superimposition ratio corresponding to the position of the knob exceeds the first value, the input unit 16 changes to a state in which the position of the first axis set can be adjusted. That is, when the position (superimposition ratio) of the knob exceeds the first value, the input unit 16 changes to a state in which the first axis and second axis (e.g., heart axis on a CT image) on the first slice image can be edited.

When the superimposition ratio corresponding to the position of the knob is lower than the second value, the input unit 16 changes to a state in which the second axis set, i.e., the first and second axes determined on the second slice image can be adjusted. That is, when the position (superimposition ratio) of the knob is lower than the second value, the input unit 16 changes to a state in which the first axis and second axis (e.g., heart axis on a SPECT image) on the second slice image can be edited.

That is, the first axis set and second axis set to be adjusted can be switched in accordance with the position of the knob input from the input unit 16. At this time, the display unit 26 displays, together with the adjustment target axis set, a superimposed image having a superimposition ratio corresponding to the position of the knob.

When a superimposition ratio corresponding to the position of the knob is positioned between the first value and the second value, the input unit 16 changes to a state in which the position of the first slice image or second slice image can be adjusted. At this time, the input unit 16 changes to a state in which the first slice image or second slice image can be edited. More specifically, for example, when a superimposition ratio corresponding to the position of the knob is positioned between a superimposition ratio of 0.5 and the first value, the input unit 16 changes to a state in which the position of the first slice image can be adjusted. For example, when a superimposition ratio corresponding to the position of the knob is positioned between a superimposition ratio of 0.5 and the second value, the input unit 16 changes to a state in which the position of the second slice image can be adjusted.

FIG. 11 is a view showing a superimposed image corresponding to a superimposition ratio together with the superimposition ratio scroll bar, the knob, and the cursor. As shown in FIG. 11, for example, when the knob on the superimposition ratio scroll bar is positioned between the first value (superimposition ratio=0.6) and a superimposition ratio of 1, the first axis set (first axis and second axis) on the first slice image can be adjusted via the input unit 16. When the knob on the superimposition ratio scroll bar shown in FIG. 11 is positioned between the second value (superimposition ratio=0.4) and a superimposition ratio of 0, the second axis set (first axis and second axis) on the second slice image can be adjusted via the input unit 16.

Further, when the knob on the superimposition ratio scroll bar shown in FIG. 11 is positioned between the first value (superimposition ratio=0.6) and a superimposition ratio of 0.5, each first slice image can be adjusted via the input unit 16. In addition, when the knob on the superimposition ratio scroll bar shown in FIG. 11 is positioned between the second value (superimposition ratio=0.4) and a superimposition ratio of 0.5, each second slice image can be adjusted via the input unit 16.

(Position Adjustment Input Function)

The position adjustment input function is to provide a state in which an input concerning position adjustment of any one of the first axis set, the second axis set, the first slice images, and the second slice images is possible in accordance with an input superimposition ratio. Processing (to be referred to as position adjustment input processing hereinafter) concerning the position adjustment input function will be explained. The processing circuitry performs a program (position adjustment input program) concerning the axis adjustment input processing.

Figure 12:
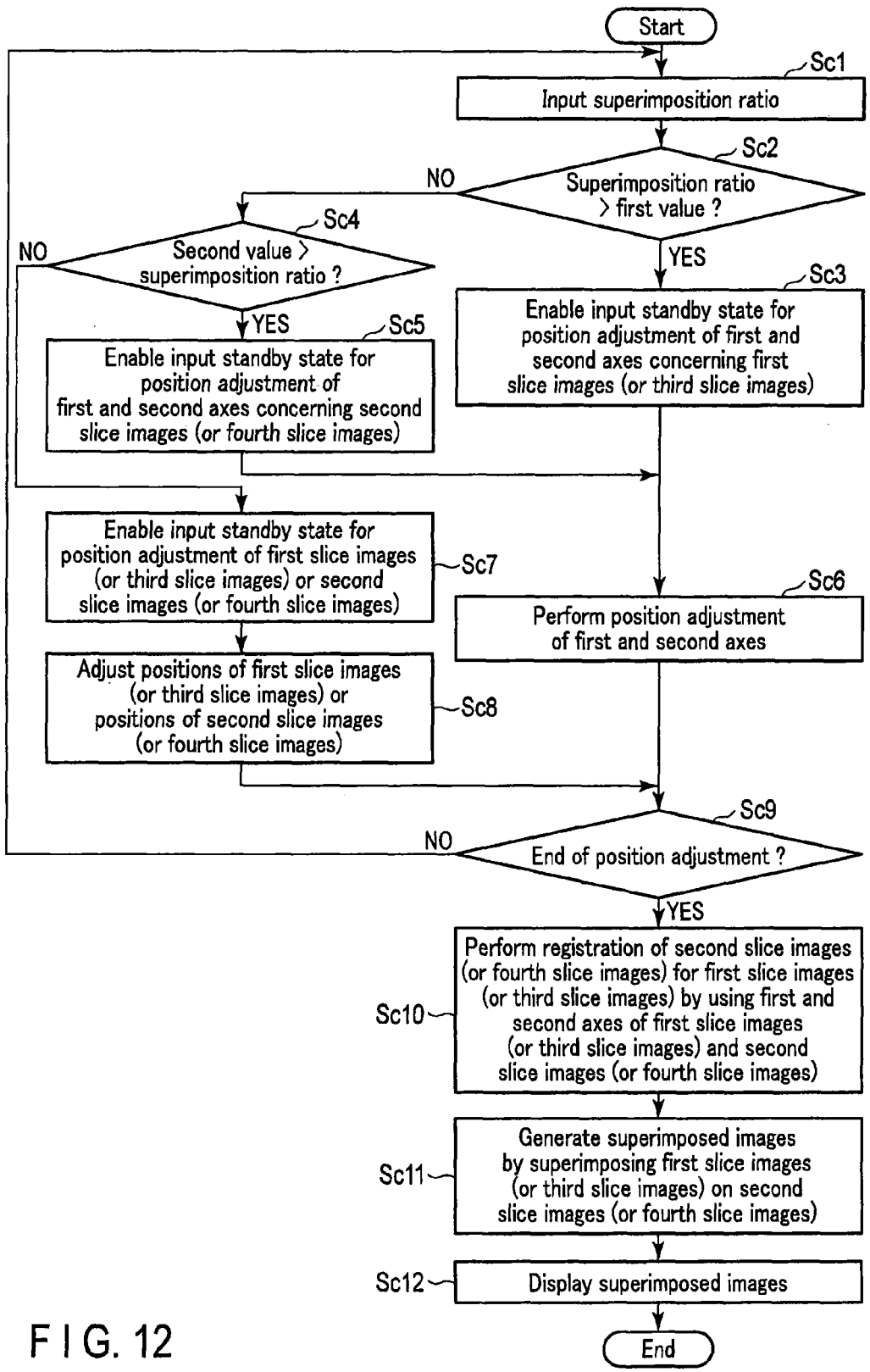
FIG. 12 is a flowchart showing an example of the procedures of position adjustment input processing according to the second modification of the embodiment.

FIG. 12 is a flowchart showing an example of the procedures of the position adjustment input processing. The flowchart in FIG. 12 corresponds to processes in step Sa9 and subsequent steps of the flowchart in FIG. 8. For example, the flowchart in FIG. 12 may be used in place of the processes in steps Sa9 and Sa10 of the flowchart in FIG. 8.

A superimposition ratio on the superimposition ratio scroll bar is input via the input unit 16 (step Sc1). If the input superimposition ratio exceeds the first value (step Sc2), an input standby state for position adjustment of the first and second axes (first axis set) concerning the first slice images (or third slice images) is enabled (step Sc3).

If the input superimposition ratio is lower than the second value (steps Sc2 and Sc4), an input standby state for position adjustment of the first and second axes (second axis set) concerning the second slice images (or fourth slice images) is enabled (step Sc5). The first axis and second axis in the first axis set or second axis set are adjusted via the input unit 16 (step Sc6).

If the input superimposition ratio is positioned between the first value and the second value (steps Sc2 and Sc4), an input standby state for position adjustment (fine adjustment) of the first slice images (or third slice images) or the second slice images (or fourth slice images) is enabled (step Sc7). The positions of the first slice images or those of the second slice images are adjusted via the input unit 16 (step Sc8).

When either one of position adjustment of the first slice images and position adjustment of the second slice images is selected as a position adjustment target, for example, the processing may be performed as follows. If the input superimposition ratio is positioned between 0.5 and the first value, an input standby state for position adjustment of the first slice images (or third slice images) is enabled. If the input superimposition ratio is positioned between 0.5 and the second value, an input standby state for position adjustment of the second slice images (or fourth slice images) is enabled.

If the position adjustment of the first axis set, the second axis set, the first slice images (or third slice images), and the second slice images (or fourth slice images) has not ended (step Sc9), the processes in steps Sc1 to Sc8 are repeated. If the position adjustment of the first axis set, the second axis set, the first slice images (or third slice images), and the second slice images (or fourth slice images) has ended (step Sc9), a registration of the second slice images (or fourth slice images) is performed for the first slice images (or third slice images) by using the first and second axes of the first slice images (or third slice images) and second slice images (or fourth slice images) (step Sc10).

Superimposed images are generated by superimposing the first slice images (or third slice images) on the second slice images (or fourth slice images) (step Sc11). At this time, a superimposition ratio concerning the superimposed image may be newly input via the input unit 16, or a superimposition ratio finally input in step Sc1 may be used. The generated superimposed images are displayed on the display unit 26 (step Sc12).

The above-described arrangement can obtain the following effects.

The medical image processing apparatus 1 according to the embodiment can determine two axes orthogonal to each other for each of a plurality of slice images (first slice images and second slice images) based on three landmarks input on the plurality of slice images concerning a registration that are desired by the operator. The medical image processing apparatus 1 can perform the registration between the plurality of slice images based on the two determined axes and the three landmarks. In addition, the medical image processing apparatus 1 according to the embodiment can determine slices suitable for observation of the three landmarks and the two axes in synchronism with the registration processing based on the three landmarks and the two axes, and display slice images concerning the determined slices.

Hence, the medical image processing apparatus 1 according to the embodiment can easily display information about adjustment of the registration, the result of the registration, and the like to the operator in adjustment of the registration by the input operation of the operator. In addition, the operability of adjustment of the registration can be improved for the operator. For example, even when the second slice image group includes a plurality of ultrasonic images and the second volume data is ultrasonic volume data not having the entire region of a predetermined organ, the registration can be performed. From this, according to the embodiment, the burden of the input operation by the operator can be reduced to easily execute adjustment of the Registration by the input operation of the operator.

For example, when performing the registration between a plurality of first slice images and a plurality of second slice images respectively corresponding slices including a region concerning the heart, a superimposed schematic image can be displayed as the navigation in input of the mitral valve, cardiac apex, and left ventricular outflow serving as the three landmarks. The long axis (first axis connecting the mitral valve and the cardiac apex) of the heart axis and the short axis (axis orthogonal to the first axis and passing through the left ventricular outflow) of the heart axis orthogonal to the long axis of the heart axis can be displayed as the two axes.

In addition, a long-axis image along the long axis of the heart axis and a short-axis image along the short axis of the heart axis (to be referred to as heart axis MPR images hereinafter) can be displayed in synchronism with adjustment of the three landmarks, the long axis of the heart axis, and the short axis of the heart axis. Display (e.g., display of the third and fourth slice images) for confirming the certainty of the positions of these two determined axes can be executed at the position of the long axis of the heart axis and that of the short axis of the heart axis.

Also, the medical image processing apparatus 1 according to the embodiment can display a slice image having an anatomical feature at a position corresponding to the anatomical feature in each of a plurality of slice images. For example, when the anatomical features are 4ch, 2ch, and SA, even if the landmark moving operation or the axis moving operation is input, the display positions of a 4ch view, 2ch view, and SA image are maintained. Even if a slice image to be displayed is changed by input of the landmark moving operation or axis moving operation, an anatomical feature in the slice image to be displayed is maintained, and the operator can easily execute adjustment of the registration.

In addition, the medical image processing apparatus 1 according to the embodiment can specify the second slice based on the first axis. Hence, the second slice can be easily specified. When the moving operation of a landmark concerning the second axis is input, the medical image processing apparatus 1 according to the embodiment can fix and display, e.g., a slice image (SA image) concerning the second slice independently of the moving operation. Even if the moving operation of a landmark concerning the second axis is input, the slice image (SA image) concerning the second slice is not moved, and the operator can easily execute adjustment of the registration.

According to the first modification of the embodiment, adjustment of the first axis set or second axis set can be executed in accordance with the value of an input superimposition ratio. While confirming or visually checking a superimposed image, the operator can adjust the first axis and second axis in the first axis set or second axis set. As a result, the medical image processing apparatus 1 according to the first modification of the embodiment can reduce the burden on the operator and improve the diagnosis efficiency in adjustment of the registration between medical images.

According to the second modification of the embodiment, adjustment of the positions of the first axis and second axis in the first axis set or second axis set, and adjustment of the positions of the first slice images (or third slice images) or the positions of the second slice images (or fourth slice images) can be executed in accordance with the value of an input superimposition ratio. While confirming or visually checking superimposed images, the operator can adjust the first axis and second axis in the first axis set or second axis set. Therefore, the medical image processing apparatus 1 according to the first modification of the embodiment can reduce the burden on the operator and improve the diagnosis efficiency in adjustment of the registration between medical images.

Note that the embodiment may be implemented by a server-client system. In the server-client system, the client includes the input unit 16 and the display unit 26. In the server-client system, the server includes the interface unit 10, the storage unit 12, the axis determination unit 14, the slice specifying unit 18, the slice image generation unit 20, the registration unit 22, the superimposed image generation unit 24, and the control unit 28. Processes (e.g., two-axis adjustment registration processing, axis adjustment input processing, and position adjustment input) concerning the respective functions according to the embodiment are executed in the server in accordance with an instruction from the operator via the input unit 16 of the client.

In addition, the respective functions according to the embodiment can be implemented by installing medial image processing programs for executing the above-described processing by using the processing circuitry in a computer such as a workstation, and loading them in the memory. At this time, the programs capable of causing the computer to execute the above-described method can be distributed by storing the programs in storage media such as magnetic disks (e.g., floppy® disks or hard disks), optical disks (e.g., CD-ROMs or DVDs), or semiconductor memories.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A medical image processing apparatus comprising:
input interface circuitry configured to input at least three landmarks in a first slice image group and a second slice image group; and
processing circuitry configured to
determine, in each of the first slice image group and the second slice image group, a first axis connecting two points out of the landmarks and a second axis that passes through another point different from the two points out of the landmarks and is orthogonal to the first axis, and
perform a registration between a plurality of first slice images belonging to the first slice image group and a plurality of second slice images belonging to the second slice image group by using the first axis and the second axis in the first slice image group and the first axis and the second axis in the second slice image group.

2. The medical image processing apparatus according to claim 1, wherein the processing circuitry configured to perform a registration of the second slice images for the first slice images by moving the first axis in the second slice images to the first axis in the first slice images, and moving the second axis in the second slice images to the second axis in the first slice images.

3. The medical image processing apparatus according to claim 1, wherein the processing circuitry is configured to:
specify, for first volume data concerning the first slice images and second volume data concerning the second slice images, when a moving operation of moving the landmark is input from the input interface circuitry, a first slice including the three landmarks, a second slice that is orthogonal to the first axis and includes the another point, and a third slice that is orthogonal to the first slice and the second slice and includes the first axis, based on position information of the three landmarks, the first axis, and the second axis,
generate a plurality of third slice images respectively corresponding to the first slice, the second slice and the third slice based on the first volume data and the specified first to third slices, and
generate a plurality of fourth slice images respectively corresponding to the first slice, the second slice and the third slice based on the second volume data and the specified first to third slices,
wherein the apparatus further comprises display circuitry configured to display the third slice images and the fourth slice images together with the three landmarks and the first axis and second axis, and
wherein the processing circuitry is configured to perform a registration of the fourth slice images for the third slice images by using the first axis and the second axis in the third slice images, and the first axis and the second axis in the fourth slice images.

4. The medical image processing apparatus according to claim 3, wherein the first slice, the second slice and third slice include different anatomical features in regard to a region of a predetermined organ in an object, and
the display circuitry is configured to display the third slice images and the fourth slice images while maintaining the anatomical features.

5. The medical image processing apparatus according to claim 4, wherein the region of the predetermined organ is a region of a heart,
the anatomical feature in the first slice is four chamber regions in the region of the heart,
the anatomical feature in the second slice is a short axis in the region of the heart, and
the anatomical feature in the third slice is two chamber regions in the region of the heart.

6. The medical image processing apparatus according to claim 1, wherein the processing circuitry is configured to:
specify, for first volume data concerning the first slice images and second volume data concerning the second slice images, when a moving operation of moving the landmark is input from the input interface circuitry, a first slice including the three landmarks, a second slice that is orthogonal to the first axis and includes a point between the two points, and a third slice that is orthogonal to the first slice and the second slice and includes the first axis, based on position information of the three landmarks, the first axis, and the second axis,
generate a plurality of third slice images respectively corresponding to the first slice, the second slice and the third slices based on the specified first to third slices and the first volume data, and
generate a plurality of fourth slice images respectively corresponding to the first slice, the second slice and the third slice based on the specified first to third slices and the second volume data,
wherein the apparatus further comprises display circuitry configured to display the third slice images and the fourth slice images together with the three landmarks and the first and second axes, and
wherein the processing circuitry is configured to perform a registration of the fourth slice images for the third slice images by using the first axis and the second axis in the third slice images, and the first axis and the second axis in the fourth slice images.

7. The medical image processing apparatus according to claim 3, wherein when the moving operation is input to the another point, the display circuitry is configured to fix and display, independently of the moving operation, slice images concerning the second slice in the third slice images and the fourth slice images.

8. The medical image processing apparatus according to claim 1, wherein the apparatus further comprises display circuitry configured to display the three landmarks, the first axis, and the second axis on the first slice images and the second slice images,
wherein the processing circuitry is configured to generate superimposed images by superimposing the second slice images on the first slice images after the registration,
wherein the input interface circuitry is configured to input a superimposition ratio indicating a ratio at which the second slice images are superimposed on the first slice images in the superimposed images, and
wherein the display circuitry is configured to display the superimposed images corresponding to the input superimposition ratio together with the first axis and the second axis.

9. The medical image processing apparatus according to claim 8, wherein when the superimposition ratio is not lower than a predetermined value, the input interface circuitry is configured to change to a state in which an input for position adjustment of the first axis and the second axis in the first slice images is possible, and
when the superimposition ratio is lower than the predetermined value, the input interface circuitry is configured to change to a state in which an input for position adjustment of the first axis and the second axis concerning the second slice images is possible.

10. The medical image processing apparatus according to claim 8, wherein when the superimposition ratio exceeds a first value, the input interface circuitry is configured to change to a state in which an input for position adjustment of the first axis and the second axis concerning the first slice images is possible,
when the superimposition ratio is lower than a second value smaller than the first value, the input interface circuitry is configured to change to a state in which an input for position adjustment of the first axis and the second axis concerning the second slice images is possible, and
when the superimposition ratio is positioned between the first value and the second value, the input interface circuitry is configured to change to a state in which an input for position adjustment of the first slice images or the second slice images is possible.

11. The medical image processing apparatus according to claim 1, wherein the first slice images and the second slice images are slice images concerning volume data generated by different medical image diagnosis apparatuses.

12. The medical image processing apparatus according to claim 1, further comprising display circuitry configured to display, at a size smaller than the first slice images and the second slice images together with the first slice images or the second slice images, superimposed schematic images obtained by superimposing the landmarks, the first axis, and the second axis on schematic images schematically representing slices respectively corresponding to the first slice image and the second slice image in the registration between the first slice images and the second slice images.

13. A medical image processing method comprising:
inputting at least three landmarks in a first slice image group and a second slice image group;
determining a first axis connecting two points out of the landmarks and a second axis that passes through another point different from the two points out of the landmarks and is orthogonal to the first axis, in each of the first slice image group and the second slice image group; and
perform a registration between a plurality of first slice images belonging to the first slice image group and a plurality of second slice images belonging to the second slice image group by using the first axis and second axis in the first slice image group and the first axis and second axis in the second slice image group.

* * * * *